(12) United States Patent
Sato

(10) Patent No.: US 8,615,453 B2
(45) Date of Patent: Dec. 24, 2013

(54) FIXED RATE FINANCING INSTRUMENT OFFERING A DIVIDEND OR PARTIALLY GUARANTEED BY THIRD PARTY TO ISSUANCE, METHOD FOR ESTABLISHING A MARKET FOR THE SAME, METHOD FOR DIRECTLY PUBLIC-OFFERING THE SAME ON-LINE

(75) Inventor: Michihiro Sato, Tokyo (JP)

(73) Assignee: Michihiro Sato, Tokyo (JP)

( * ) Notice: Subject to any disclaimer, the term of this patent is extended or adjusted under 35 U.S.C. 154(b) by 1063 days.

(21) Appl. No.: 11/898,448

(22) Filed: Sep. 12, 2007

(65) Prior Publication Data

US 2008/0033872 A1 Feb. 7, 2008

Related U.S. Application Data

(60) Division of application No. 11/148,406, filed on Jun. 9, 2005, now Pat. No. 7,536,330, which is a continuation-in-part of application No. 10/233,995, filed on Aug. 30, 2002, now abandoned, and a continuation-in-part of application No. 10/358,432, filed on Feb. 4, 2003, now abandoned, and a continuation-in-part of application No. 10/376,358, filed on Feb. 27, 2003, now abandoned, and a continuation-in-part of application No. 10/444,870, filed on May 23, 2003, now abandoned.

(30) Foreign Application Priority Data

| Sep. 3, 2001 | (JP) | 2001-265178 |
| Feb. 5, 2002 | (JP) | 2002-27550 |
| Feb. 27, 2002 | (JP) | 2002-51085 |
| Mar. 11, 2002 | (JP) | 2002-65123 |
| May 31, 2002 | (JP) | 2002-158595 |
| Sep. 3, 2002 | (JP) | 2002-257497 |
| Feb. 4, 2003 | (JP) | 2003-27127 |

(51) Int. Cl.
*G06Q 40/00* (2012.01)

(52) U.S. Cl.
USPC ............................................................ 705/35

(58) Field of Classification Search
USPC ......................................................... 705/35–45
See application file for complete search history.

(56) References Cited

U.S. PATENT DOCUMENTS

| 6,934,692 B1 | 8/2005 | Duncan | |
| 7,324,969 B2 * | 1/2008 | Pallister et al. | 705/37 |

(Continued)

FOREIGN PATENT DOCUMENTS

| JP | 09-093561 | 5/1996 |
| WO | WO 03/100567 A2 | 5/2003 |

OTHER PUBLICATIONS

"The Challenge of Financing Infrastructure in Developing Countries", Global Development Finance 2004, pp. 149-167.

(Continued)

*Primary Examiner* — Richard C Weisberger
(74) *Attorney, Agent, or Firm* — Stites & Harbison PLLC; Juan Carlos A. Marquez, Esq.

(57) ABSTRACT

A fixed rate financing instrument issued by a corporation, government, or other organization which pays a fixed interest rate and/or dividend as secured by an issuing entity's promise to pay and partially guaranteed by a third party to issuance. An operation financing system for public-offering the fixed rate financing instrument on-line directly by the issuing entity or for public-offering the fixed rate financing instrument through a direct purchase plan by the issuing entity. A method for forming a new market includes preparing the fixed rate financing instrument, public-offering the fixed rate financing instrument, delivering to a potential purchaser the financial disclosure as required by law, requesting the potential purchaser to acknowledge receipt and review of the financial disclosure as required by law, and confirming acknowledgement of the financial disclosure from the potential purchaser; and processing a requested transaction by retrieving information via a network to a server.

18 Claims, 7 Drawing Sheets

BOND CERTIFICATE ACCORDING TO AN EMBODIMENT OF THE PRESENT INVENTION

(56) References Cited

U.S. PATENT DOCUMENTS

2002/0016758 A1 2/2002 Grigsby
2002/0174046 A1 11/2002 Mistretta
2004/0039972 A1 2/2004 Chung
2005/0071250 A1 3/2005 Weisbach et al.

OTHER PUBLICATIONS

Josë A. Trujillo et al., "Infrastructure Financing with Unbundled Mechanisms", Dec. 1997, No. IFM-109, pp. 1-24.
"eCommerce in the Fixed-Income Markets", the 2004 Review of Electronic Transaction Systems (Dec. 2004), 33 pages.
"Direct Purchase", American Stock Transfer & Trust Company, http://www.amstock.com.investpower/new_dp.asp, 1 page.
"Direct Investment Folio Services, DPPs and DRIPs", Direct Purchase Plans and Direct Reinvestment Plans, http://www.wall-street.com/direct/html, 5 pages.
"Buying ADSs Through Direct Purchase" Novartis Investor Relations—ADS direct Purchase Program, http://www.novartis.com/investors/en/ads.shtml, 1 Page.
"Financing of Major Infrastructure and Public Service Projects", Editors Jean-Yves Perrot and Gautier Chatelus, Presses de l'École Nationale des Ponts et Chaussées, pp. 9-13.
Michel Bellier, "Financing Urban Public Infrastructure (Module 7: Financing Urban Development", 31 pages.
Investopedia.com, definition: Hybrid Security, dated Jun. 13, 2002 by http://web.archive.org (Wayback Machine).
"The Japan-U.S. Latest Instance and Method of System Construction from Finance Delivery Strategy to Online Securities Trading", On-Line Banking, Nikkei Business Publications, Inc., Japan, Dec. 1998, cover page, and pp. 94-105 in Japanese with 1 page of partial English translation.

* cited by examiner

BOND CERTIFICATE ACCORDING TO AN EMBODIMENT OF THE PRESENT INVENTION

AN EXAMPLE OF BOND CERTIFICATE BASED ON THE SPC LAW

Fig. 5

| Securities Identification | 20040404 | | | | | 20030201 | | | | | 20001025 | | | | |
|---|---|---|---|---|---|---|---|---|---|---|---|---|---|---|---|
| Name of Public Work | ODAIBA CASINO | | | | | NUMAZU MUNICIPAL HOSPITAL | | | | | SAITAMA STATION FRONT BUILDING | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Construction of casino in Odaiba and its operation | | | | | Construction of municipal hospital in Numazu and its operation | | | | | Construction of building in front of Saitama station and its operation | | | | |
| Planner | Japan Gov | | | | | South Korea Gov | | | | | China Gov | | | | |
| Executor | The Metropolis of Tokyo and some management company in Las Vegas | | | | | Numazu City | | | | | Saitama City | | | | |
| Guarantor | United States Gov | | | | | Japan Gov | | | | | China Gov | | | | |
| Redemption Period | 10 years | | | | | 5 years | | | | | 8 years | | | | |
| Interest Rate (Annual) | 3% | | | | | 2% | | | | | 2.5% | | | | |
| Guaranteed Limit | 70% | | | | | 80% | | | | | 80% | | | | |
| Dividend | None | | | | | None | | | | | None | | | | |
| Comment of Related Parties | Comment from the Governor of Tokyo | | | | | Comment from the Mayor of Numazu | | | | | Comment from the Mayor of Saitama | | | | |

Fig. 6

| Securities Identification | 20020401 | | | | | 20020938 | | | | | 20060825 | | | | |
|---|---|---|---|---|---|---|---|---|---|---|---|---|---|---|---|
| Name of Public Work | JAPANESE HIGHWAY | | | | | STOMACH CANCER SUPPRESSANT DEVELOPMENT PROJECT | | | | | XX SATELLITE PROJECT | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Operation of Tomei Highway | | | | | Development of stomach cancer suppressant | | | | | Launching and operation of XX satellite | | | | |
| Planner | | | | | | Japan | | | | | Japan / National Space Development Agency | | | | |
| Executor | Japan Highway Public Corporation | | | | | Takeda Chemical Industries, Ltd. | | | | | National Space Development Agency | | | | |
| Guarantor | Japan Gov | | | | | Japan / UFJ Bank | | | | | Japan / Mitsubishi Heavy Industries, Ltd. | | | | |
| Redemption Period | None | | | | | 10 years | | | | | 6 years | | | | |
| Interest Rate (Annual) | 3% | | | | | 2.5% | | | | | 2% | | | | |
| Guaranteed Limit | 60% | | | | | 50% | | | | | 85% | | | | |
| Dividend | Yes | | | | | None | | | | | None | | | | |
| Comment of Related Parties | Comment from the Prime Minister of Japan | | | | | Comment from the President of Takeda Chemical Industries, Ltd. | | | | | Comment from National Space Development Agency and Director of the Science and Technology Agency | | | | |

Fig. 7

| Securities Identification | 20100962 | | | | | 20904829 | | | | |
|---|---|---|---|---|---|---|---|---|---|---|
| Name of Public Work | YY Oil Field Project | | | | | ZZ Natural Gas Project | | | | |
| Face Value (Million yen) | 100 | 50 | 10 | 5 | 1 | 100 | 50 | 10 | 5 | 1 |
| Contents of Public Work | Development and Management of YY Oil Field | | | | | Development and Management of ZZ Natural Gas | | | | |
| Planner | Japan / Russia / Gulf Oil Co. | | | | | Japan / Canada / Occidental Oil Co. | | | | |
| Executor | Gulf Oil Co. | | | | | Occidental Oil Co. | | | | |
| Guarantor | Japan / Russia Govs | | | | | Japan / Canada Govs | | | | |
| Redemption Period | 10 years | | | | | 9 years | | | | |
| Interest Rate (Annual) | 5% | | | | | 2.5% | | | | |
| Guaranteed Limit | 70% | | | | | 65% | | | | |
| Dividend | None | | | | | None | | | | |
| Comment of Related Parties | Comment from the President of Russia | | | | | Comment from the President of Canada | | | | |

FIXED RATE FINANCING INSTRUMENT OFFERING A DIVIDEND OR PARTIALLY GUARANTEED BY THIRD PARTY TO ISSUANCE, METHOD FOR ESTABLISHING A MARKET FOR THE SAME, METHOD FOR DIRECTLY PUBLIC-OFFERING THE SAME ON-LINE

CROSS-REFERENCE TO RELATED APPLICATION

This application is a Divisional of U.S. application Ser. No. 11/148,406 filed on Jun. 9, 2005, now U.S. Pat. No. 7,536,330 which is a Continuation-in-Part application of U.S. application Ser. Nos. 10/233,995 filed on Aug. 30, 2002, now abandoned 10/358,432 filed on Feb. 4, 2003 now abandoned and 10/376,358 filed on Feb. 27, 2003 now abandoned and 10/444,870 filed on May 23, 2003, now abandoned Priority is claimed based U.S. application Ser. No. 11/148,406 filed on Jun. 9, 2005, which is based on the parent U.S. application Ser. Nos. 10/233,995 filed on Aug. 30, 2002, 10/358,432 filed on Feb. 4, 2003 and 10/376,358 filed on Feb. 27, 2003 and 10/444,870 filed on May 23, 2003, which claim the priority dates of Sep. 3, 2001, Feb. 5, 2002, Feb. 27, 2002, Mar. 11, 2002, May 31, 2002, Sep. 3, 2002 and Feb. 4, 2003, the filing dates of Japanese Patent Application Nos. 2001-265178, 2002-27550, 2002-51085, 2002-65123, 2002-158595, 2002-257497 and 2003-27127, respectively.

BACKGROUND OF THE INVENTION

1. Field of the Invention

The present invention relates to fixed rate financing instruments issued for acquiring private funds and investments, offering a dividend or partially guaranteed by third parties to issuance, i.e., personals or entities other than the issuers/grantors and buyers of the financing instruments. The invention is also related to systems, servers, methods, programs and computer-readable recording media for establishing a market for the fixed rate financing instruments, and a method for directly offering the fixed rate financing instruments on-line. In particular, the financing instruments attract private funds and investments to finance public works or projects, such as infrastructure improvement projects.

2. Description of the Prior Art

Constructions and operations of public facilities such as roads and railroads, facilities for public benefits such as healthcare facilities and social benefit facilities are of great concerns of the residents who live in the related area, as they affect the basics of their life. It is difficult for them to walk or drive without decent roads. It is impossible for them to receive healthcares if there are no hospitals and other healthcare facilities when they get sick.

Therefore, those who live in an area where facilities that affect the basics of residents' life, i.e., infrastructures (basic facilities of a society) are poor try to move to another area where infrastructures are better. This creates a tendency for population concentration in big cities where those infrastructures are well established, for example, Tokyo and Osaka in case of Japan. The concentration of population causes problems such as longer commuting time, higher rents, smaller living quarters, and excessive traffic congestions.

Thus, each country of the world is planning to improve infrastructures such as roads and healthcare facilities in various regions in the country, but it is also true that the governments are experiencing severe financial tightness everywhere in the world in recent years. Thus they are having difficulties in financing public works such as infrastructure improvement projects from tax revenues alone. It is indispensable to infuse some private funds into public works such as infrastructure improvement projects in order to alleviate the burden on tax money under the current financial tightness.

There are numerous financial instruments for raising capital, as described in, for instance, in U.S. Pat. No. 6,148,293 to King titled "Method and Apparatus of Creating a Financial Instrument and Administering an Adjustable Rate Loan System".

In infrastructure financing, the borrower arranges for an accepted guarantee-issuer to provide an irrevocable and unconditional guarantee in favor of a lender as beneficiary for repayment of a loan principal amount with all due interest for the loan term plus the lender's fees. The lender then provides or facilitates financing for public works projects through bond issuance and other means. As a means of acquiring private funds for investments in public works, a national or local government issues bonds. Bonds are essentially negotiable papers issued for acquiring funds from a wide range of citizens. If issuers of bonds are a national or local government or an organization related to a government, the bonds are called public bonds.

In such public bonds, there has been a type of bonds issued by a national or local government for the purpose of acquiring private funds for public works such as infrastructure improvement projects. Such bonds are called government guaranteed bonds. Government guaranteed bonds are bonds whose issuer's liabilities for the repayment of the principal and related interests are guaranteed by the pertinent government.

On the other hand, bonds whose issuers are a private enterprise are called industrial bonds. Industrial bonds include bonds related to the SPC Law (Law concerning Liquidation of Special Assets of Special Purpose Company). Bonds covered by the SPC Law are bonds related to so-called "project finance." Bonds related to project finance are bonds issued for acquiring funds for executing a specific project. For example, if the use of the capital acquired by a bond issued in relation to the construction and operation of a commercial building to be erected in front of a railway station is specified for the project of "construction and operation of the station front building," the bond is regarded as a bond related to the project finance and a bond related to the SPC Law. Key bond terms as shown in FIG. 3 include "Construction & Operation Bond for Y Station Front Building," "principal and the interest shall be redeemable in 20 years from the issuing date", "The redemption payment for this bond shall be available in exchange for this certificate at X Bank's main office or at any of its branch or agent" (e.g., "¥100,000,"), "If the redemption date happened to be a bank holiday, the payment shall be made on the next business day," "The bond shall be void in 10 years from the day after the redemption date," "Registration and replacement of the bond certificate for reasons of soiling or damage or any other handling of the bond certificate shall be available at X Bank's main office or at any of its branch or agent," "Issuing Date: Apr. 1, 2002," and "Redemption Date: Mar. 31, 2022," etc. Different countries have different laws or regulations governing bonds or other fixed rate financing instruments. The SPC law of Japan is used as an example.

In the US, bonds pay interest that can be fixed, floating or payable at maturity. Most debt securities carry an interest rate that stays fixed until maturity and is a percentage of the face (principal) amount. Typically, investors receive interest payments semiannually. For example, a $1,000 bond with an 8% interest rate will pay investors $80 a year, in payments of $40 every six months. When the bond matures, investors receive the full face amount of the bond—$1,000. The interest rate on a floating-rate bond is reset periodically in line with changes in a base interest-rate index, such as the rate on Treasury bills. Some bonds have no periodic interest payments. Instead, the investor receives one payment—at maturity—that is equal to the purchase price (principal) plus the total interest earned, compounded semiannually at the (original) interest rate. Known as zero-coupon bonds, they are sold at a substantial discount from their face amount. For example, a bond with a face amount of $20,000 maturing in 20 years might be purchased for about $5,050. At the end of the 20 years, the investor will receive $20,000. The difference between $20,000 and $5,050 represents the interest, based on an interest rate of 7%, which compounds automatically until the bond matures.

PFI (public finance initiative; improvement of social funds using private funds) is intended to efficiently and effectively improve social funds by means of promoting constructions, maintenances and operations (including planning thereof) of public facilities utilizing private funds, management capabilities and technological capabilities so as to contribute to healthy development of national economy (Article 1 of Japanese Law concerning Promotion of Improvement of Public Facilities, etc., Utilizing Private funds, etc.). The relation between a private enterprise, a national or local government, residents, and banks, securities companies, etc. (hereinafter called "financial institutions") in a scheme of PFI is as shown in FIG. 4.

A private enterprise prepares funds (32) by borrowing money from a financial institution, executes construction and operation of a public facility such as a road, a prison, or a public housing (33) to provide public services to residents (34). A national or local government pay considerations (35) to the private enterprise for the services the enterprise provides to the residents on behalf of the a national or local government. For example, if the public service is the operation of a prison, the national or local government pay considerations (35) to the private enterprise for operating the prison on behalf of the national or local government.

The residents receive the services (34) provided by the private enterprise and pay the considerations (36) for the services or service fees, and the private enterprise obtains income/profit (37) through its involvement in the public works. The residents in return deposit money (31) in the financial institution, and the financial institution lends money as investment (32) to the private enterprise and receives the repayment of the capital and the payment of the interest.

Thus, PFI is a means, which has been known for private institutions for obtaining funds from private financial institutions for the purpose of conducting public works such as infrastructure improvement projects. Also known in PFI is a method of obtaining funds through bond issues instead of borrowing money from financial institutions.

However, there is a problem as shown below in the above-mentioned government guaranteed bonds, project finance bonds and PFI. For example, in case of government 100% guaranteed bonds, a government guarantees the bond issuer's full liabilities of repayment of principals and interest so that it may end up wasting a large some of tax money in fulfilling its guaranteed obligations. Therefore, it is difficult to improve necessary infrastructures using government guaranteed bonds under a tight financial condition.

In case of project finance bonds, there is another problem that bond buyers are generally reluctant to buy bonds intended for public works projects to be executed by a private enterprise, because, when a private enterprise, which issued project finance bonds, fails in operating public works and the performance deteriorates, there is no guaranty for repayment to the buyers of the project finance bonds. Therefore, it is also difficult to improve necessary infrastructures using project finance bonds as well.

Moreover, in case of PFI, investments by financial institutions to a private enterprise are generally insufficient, because the credibility of a private enterprise, which engages in risky public works, is generally too low. Therefore, it is difficult to attract private funds into public works through PFI because there is no guaranty for repayment for the bond issuers' liabilities for principal and interest repayment liabilities similar even if it is guaranteed by a government when the government is under a tight financial condition.

A document titled "Financing of major infrastructure and public services projects: Lessons from French experience throughout the would" by DAEI (French Ministry of Public Works, Economic and International Affairs Division), Private Financing of Public Infrastructure, Paris, 1994, describes various public-private partnership (PPP) models with different allocations of responsibilities: operations and maintenance contract, lease, build operate and transfer (assets), concession of service provision to users. The Private Participation in Infrastructure (PPI) Project Database of the World Bank tracks information on more than 2,700 infrastructure projects with private investment in the energy (electricity and natural gas), telecommunications, transport, and water and sewerage sectors in low- and middle-income countries.

In the model of Build-Operate-Transfer (BOT) or Build-Operate-Own-Transfer (BOOT), a private entity receives a franchise from the public sector to finance, design, construct, and operate a facility for a specified period of time, after which the ownership of the project and the facility is transferred back to the public sector. During the time that the project proponent operates the facility, it is allowed to charge facility users appropriate tolls, fees, rentals, and charges stated in their contract to enable the project proponent to recover its investment, and operating and maintenance expenses in the project. Even though the private management of public projects generates efficiency gains, BOT requires the private entity to raise its own funds, which is rather difficult.

Most infrastructure finance deals draw on an array of local and international funding sources, including syndicated commercial bank loans, bond issuances, equipment leasing, multilateral and export credit agency loans or guarantees, and equity commitments by project promoters and dedicated equity funds. For example, as described in Ch. 6 of the book titled "Global Development Finance 2004—Harnessing Cyclical Gains for Development" by World Bank, Vietnam's first international Build-Operate-Transfer power project, Phu My 3, with a generating capacity of 717 megawatts, reached financial closure in June 2003. Three-quarters of the funding took the form of debt, $40 million of which came from the Asian Development Bank; $99 million from the Japanese export credit agency, JBIC; and $170 million from a syndicate of international banks (Bank of Tokyo-Mitsubishi, Credit Agricole Indosuez, Credit Lyonnais, Fortis Bank, and Mizuho Corporate Bank). The equity component of $103 million was provided by the main sponsors (Electricite de France, Sumitomo Corporation, and Tokyo Electric Power Company), as shareholders' capital. The extended political risk insurance supporting the commercial tranche is provided by the Asian Development Bank, the Multilateral Investment Guarantee Agency, and Nippon Export and Investment Insurance. The financing structure of Phu My 3, with several types of debt, equity, and credit enhancements, is not unique to Vietnam or the power sector. It ensured access to international capital markets and enhanced efficiency by reducing overall financing costs, and extending debt maturity to match the project's underlying economics. Although the project involved several types of debt, equity, and credit enhancements, it did not provide one single investment instrument with characteristics of both debt and equity.

The traditional means for raising funds for business operations are roughly divided into two legal categories. One has the nature of equity to which an investor can not claim repayment of paid in capital against a company that had received fund from such investor as a means of fund for its business such as investment in stocks, and the other has the nature of debt which a investor can claim repayment of principal at the date of maturity as in the case of an investment in bonds. Considerations to investor for fund to business, in the case of stock, is "dividend," and in the case of bond or loan is "interest."

All securities stipulated by the Japanese laws are categorized in each of the two categories above, there are no securities which belong to both of them legally. Currently, in the U.S. and other countries, some fund raising means having middle nature between them, such as mezzanine funds. Private equity and mezzanine funds, typically structured as limited partnerships, are unregulated collective investment schemes, and have therefore been marketable to private individuals. It will takes a long period of time for governments to resolve the relevant issues, such as their tax treatment as debt or equity.

The variety of securities are rigorously defined as follows under Clause 1, Article 2 of the Japanese Law:

i) Government security,
ii) Municipal bond,
iii) Debt security issued by a juridical person under a special law,
iv) Specified corporate debt security prescribed in the Law Concerning the Mobilization of Assets,
v) Corporate debt security,
vi) Equity security issued by a juridical person established under a special law,
vii) Preferred equity security prescribed in the Law Concerning Preferred Equity Contribution to Cooperative Financial Institutions or instrument representing the right to subscribe thereto,
viii) Preferred equity security prescribed in the Law Concerning the Mobilization of Assets, or security representing the right to subscribe thereto,
ix) Share certificate, subscription right certificate, subscription warrant certificate,
x) Beneficiary security of an investment trust or foreign investment trust prescribed in the Law Concerning Investment Trusts and Investment Corporations,
xi) Investment security or foreign investment security prescribed in the Law Concerning Investment Trusts and investment Corporations,
xii) Beneficiary security of a loan trust,
xiii) Beneficiary security of a special purpose trust prescribed in the Law Concerning the Mobilization of Assets,
xiv) Such promissory note issued by an juridical person to raise fund necessary for its business as may be prescribed by an ordinance of the Cabinet Office (Commercial paper),
xv) Security or instrument issued by the government or a juridical person of a foreign country that has the nature of any security or instrument set forth in i) through ix), or xii), xiii) or xiv) hereof (Foreign share certificate, foreign commercial paper, etc.),
xvi) Such security or instrument issued by a foreign juridical person representing the beneficiary right to a trust set up on the basis of loan credits of a person engaged in the banking business or any other form of money-lending business, or any other right similar thereto, as may be prescribed by an ordinance of Cabinet Office (Beneficiary security of trust, etc.),
xvii) Security or instrument set forth in each of i) through xvi), xviii) and xix) hereof, or security or instrument representing rights pertaining to trade in options contract on a security or to trade in over-the-counter options contract on a security that has the right to be regarded as security,
xviii) Security or instrument issued by a person who has received a deposit of a security or instrument set forth in i) through xvii) hereto and issued in a country other than one in which such security or instrument on deposit was issued, representing the right pertaining to the security or instrument on deposit (ADR, etc.), or
xix) Such security or instrument other than those set forth in each of the i) through xviii) hereto as may be prescribed by a Cabinet order as one that is deemed to require the assurance of the public interest or the protection of investors in the light of its liquidity and other circumstances (Certificate of negotiable deposit issued by foreign juridical person).

Accordingly, all securities stipulated by the Japanese Law are categorized in each of the two categories of debts and equity, there are no securities which has the characteristics of both legally.

In Japan, the classification between equity and debt is approached through the view of what kind of legal formality has been adopted, there is no security that has been developed having characteristics of both, and they are distinguished by a standard: if an instrument has been adopted using the legal formality of equity, although it also has a nature of debt, it shall be treated as an equity; and if an instrument has been adopted using the legal formality of debt, although it also has a nature of equity, it shall be treated as a debt. For example, a "Subordinated Loan" is popular in Japan and is utilized by the government to pour public funds into some financial institutions. Although a "Subordinated Loan" can be categorized as having a middle nature because, when the debtor becomes insolvent, it is inferior to a normal loan regarding superiority of repayment, but is superior to a repayment of capital to an equity holder, a "Subordinated Loan" is legally categorized as a debt, and a compensation/payment is "interest" which the rate of such interest is usually higher than that of an ordinary loan.

SEC is the governing body in the US oversee the bond markets to protect investors by ensuring accurate information disclosure for valuing companies and securities and ensuring efficient secondary markets for debt issuance by corporations and state and local governments. While institutional investors dominate the bond markets, retail investors' participation is on the rise. U.S. households hold more corporate debt than municipal bonds. Approximately 65% of trades in investment grade, high yield and convertible debt are under $100,000 in size, a range assumed to represent retail activity, and there are comparable levels of retail activity across the spectrum of credit quality.

The members of the National Association of Securities Dealers, Inc. ("NASD") must report transaction information on transactions in all corporate debt instruments, including both investment grade and high-yield debt securities, within 45 minutes of execution. Professionals access the Trade Reporting and Compliance Engine (TRACE) Data on a "real time" basis (as long as they are undated, not when the transactions are matched) through the TRACE website or market data vendors, and many more access it on a delayed basis. While most corporate bond trades are now reported to the NASD, not all of that data is disseminated to market users. So far, the NASD disseminates transaction information on more than 4,700 securities, including large issue investment-grade bonds, 50 high-yield bonds, and an additional 120 BBB-rated bonds. These bonds account for about 70% of the dollar value of trading activity in investment grade bonds, including the most actively traded bonds. The NASD's Bond Transaction Reporting Committee ("BRTC") continues to discuss the next phase of dissemination of trade data for all remaining bonds. The remaining bonds include the smaller investment-grade instruments and high-yield bonds, in which there is considerable retail and institutional interest. It is these types of high-yield bonds—offering higher interest, yet lower quality—where pricing decisions are the most difficult and where real-time information would be most beneficial to investors and dealers as well.

Most corporation bonds are unsecured debt obligations backed only by the issuer's general credit and the capacity of its cash flow to repay interest and principal. Once a bond issue is closed, debt service payments are made by the issuer to the bondholders through a paying agent or trustee, which is a bank chosen by the issuer. If the bond issue ever goes into default, the paying agent or trustee usually represents the bondholders in remedial proceedings against the issuer. Guaranteed bond come with a guarantee of one corporation's bonds by another entity. For example, bonds issued by a subsidiary may be guaranteed by the parent corporation. Or bonds issued by a joint venture between two companies are 100% guaranteed by both parent corporations. Guaranteed bonds become, in effect, debentures of a guaranteeing corporation and benefit from its presumably better credit. Sometimes, it makes economic sense for the issuer to pay a third party to guarantee the bond issue which is called credit enhancement. An insurance company may issue an insurance policy 100% guaranteeing payment of debt service on the bonds, or a bank may issue a letter of credit to 100% guarantee the bonds.

In US, some bonds have characteristics of equity but still fall into the category of debt. For example, income bonds or revenue bonds are bonds that promise to pay interest only when earned by the issuer, and failure to pay interest does not result in default. As such, it is unattractive to private investors. As another example, combination bonds are bonds with double guarantee. A combination bond is guaranteed by revenue generated from the project that the bond is financing and guaranteed by the full faith and credit of the government issuing the bond, i.e., an unconditional commitment to pay 100% of interest and principal on debt. Although they are fully guaranteed by a government, when the government is under a tight financial condition or suffers from big spending or trade deficits, the government gets unduly burdened and investors get cold-feet.

There is a need for a fixed rate financing instrument having characteristics of both debt and equity to provide sufficient confidence to private investment without unduly burdening governments or third parties to the issuance of such a financing instrument. Once such a new financing instruments become available, there are needs for a method for establishing a market for them and for a method for offering them on-line.

A stock or bond newly offered for sale by a corporation or a government entity, usually through an underwriter or a private placement. A private placement is only available directly to institutional investors, such as banks, mutual funds, insurance companies, pension funds, and foundations, which does not require SEC registration, provided the securities are bought for investment purposes rather than resale. To newly offer a stock or bond to the public, an underwriter or underwriting syndicate is indispensable, which guarantees purchase of all shares of stocks or bonds being issued by the corporation or government entity, including an agreement to purchase by the underwriter if the public does not buy all the shares or bonds to assume risk. The SEC requires: offers cannot be made before a registration statement has been filed with the SEC; only oral offers can be made after a registration statement is filed; written offers can not be made until the registration statement is declared effective by the SEC staff; offers can not be accepted until a registration statement becomes effective; and after a registration statement is declared effective, sales literature can not be delivered unless accompanied or preceded by a final statutory prospectus.

An on-line offering registered with the SEC that is offered or sold—partly or wholly—using electronic media, including the internet, e-mails, or CD-ROMs. In some cases, not only are offers and sales made electronically, but also an issuer's and/or underwriter's delivery obligations are met electronically. The term "e-offering" typically is used to describe an underwritten offering in which one or more underwriters make offers and sales through a Web site and/or e-mails. Some of the underwriters who specialize in this area refer to themselves as "e-underwriters," such as Wit Soundview®, Charles Schwabe®, e*Trade®, DLJdirecWR®, Hambrecht®, etc. Technology is leveraged to reduce costs, facilitate communication and keep better track of how an offering is progressing. Companies or underwriters use Web site prospectuses to reach a broader pool of potential investors. The underwriters easily build their "book" of indications of interest via e-mail. Potential investors easily research a company's and its industry's prospects. Electronic delivery reduces printing and postage costs.

However, there are gray legal issues regarding e-offering which have not been addressed by the SEC or the courts in the US. Hopefully, more formal and informal guidance (procedures submitted by underwriters and issuers and then reviewed and approved by Office of Chief Counsel of the Division of Corporation Finance of SEC on an individual basis) will become available. For example, companies that conducted IPO Dutch auctions included: Ravenswood Winery Inc. (Feb. 4, 1999), Salon Internet Inc. (Apr. 19, 1999), Andover.net (Sep. 16, 1999), and Nogatech Inc. (Mar. 14, 2000). After the dot.com bobbles burst in 2000, Google.com had its on-line initial public offerings (IPO) in August 2004 in which the process of applying for newly issued shares was handled electronically (via websites). Morgan Stanley and Credit Suisse First Boston were named as the lead underwriters for the deal.

During 2000, there were several pioneers that used the Internet to issue debt off a shelf, such as Dow Chemical, Ford Motor Credit Company, Goldman Sachs, Discover Financial Services, PeopleFirst, and Fiat Spa. During 2000, several exempt issuers (i.e. which were not required to register their offerings or file periodic reports) issued bonds off a shelf using the Internet to varying degrees—including the World Bank, Freddie Mac, and Fannie Mae. Even though the amount of underwriting compensation typically charged in public offerings of investment-grade debt securities is less than 1%, which is below those charged in equity offerings, the issuers can choose to file without underwriters. There is a need to offer new bond or fixed rate financing instruments on-line to the public without mountains of red tape, expenses paid to the underwriters etc.

Direct Stock Purchase Plans are SEC-regulated and established by companies to enable investors to purchase company shares without the intervention of a broker and paying a commission. Larger companies with a liquid market for its stock tend to have direct stock purchase plans. Companies benefit from the ability to cross-market their products and services and raise capital inexpensively. Eligibility criteria, investment program procedures, and program features may vary substantially from program to program. Some companies administer the sale of stock directly through their corporate offices, while others use a plan run through a bank or a trust company, which may also functions as transfer agent. The shares may be retained by a stock transfer or trust company, or converted to certificate form and mailed to an investor. Upon the submission of a share purchase order, an investor will receive an immediate e-mail confirmation of the order as well as a list of the exact price of the shares purchased. Until now, the accepted practice for Direct Purchase programs are to aggregate all purchase orders submitted over the course of a week, semi-week, or a day (by 4:00 p.m.) and to execute them all at once. The purchase price will not be known until the purchase is completed at a later time. Such a process introduces a fair degree of uncertainty to the process and dissuades many potential investors from participating in the program. There is a need to offer new stock or bond on-line to the public with real-time pricing. In U.S., investors can buy bonds directly from the government through TreasuryDirect at http://www.treasurydirect.gov. Currently, there is no direct purchase plan for corporate bonds or other financing instruments issued by private corporations. There is a need to directly offer new bonds and fixed rate financing instruments on-line to the public or via a direct purchase plan.

The Bond Market Association published a survey in December 2004 titled "eCommerce in the Fixed rate Markets: the 2004 Review of Electronic Transaction Systems" which catalogs and describes all systems that allow dealers or institutional investors to buy or sell fixed rate products electronically. Online bond trading platforms have accelerated the development and implementation of value-added services to enhance the efficiency of electronic trade execution and reduce users' costs. Most corporate/agency bonds trade over-the-counter; nevertheless, there are some bonds called "listed" bonds or "exchange-traded" bonds that trade on the New York Stock Exchange. The OCT market is comprised of dealers that hold an inventory of bonds, who buy and sell for their own account. Others act as agents and buy from or sell to other dealers in response to specific customer requests. These OCT bonds are traded on the "secondary" market and are available at dealers. If an individual inventor sends a "firm" bid to a dealer for selling OCT bonds, the investor must be reachable by phone or email for the next hour or two. Usually firm bids are good for one hour. If the dealer has no inventory, it may take over well over an hour for the dealer's trader to call various other dealers and for the other dealers to get back to the initiating dealer with bids. At times, there may not be any dealer wanting to purchase the bond. Orders to sell are handled on a best effort basis only.

New York Stock Exchange (NYSE) requires all bonds to be traded in the Automated Bond System (ABS) that records bids and offers for inactively traded bonds until they are canceled or executed, and matches them on a price and time priority basis. Because bids and ask prices of inactively traded bonds aren't constantly changing due to demand and supply conditions, investors have difficulties to look for a quote. By electronically monitoring all inactive bonds, the NYSE keeps an inventory of bond prices for investors to check.

Users can access a database of all trades executed on the system and, in some cases, trades executed on other platforms or by voice. The National Association of Securities Dealers in the corporate market and the Municipal Securities Rulemaking Board in the municipal market are trying to expand their trade reporting systems in early 2005. Bond Exchange of South Africa (BERS) was formally licensed in May 1996 as a licensed financial exchange on which bonds and related products were to be traded and matched on the same trading day on which the trade is struck, and all trades must be reported and matched to BERS within one hour from which the trade is struck South African bonds are quoted and traded in yield, and are settled in price. There is a standard convention for converting between the yield and the price of a bond for a given settlement date. However, BERS does not process bond transactions as efficient as a stock exchange executes stock transactions. The Bond Market Association actively promotes and urges the SEC to establish a self-regulatory organization for the debt market. There is a need for a bond and fixed rate instrument exchange which processes transactions as efficient as the stock exchange executes stock transactions.

Bond market information is available at a website sponsored by the Bond Market Association with data form MSRB and Standard & Poor's ("S&P"). It divides bonds into Municipal Market, Government Market, Corporate Market, and mortgage-backed (MBS) and asset-backed (ABS) Market. As mentioned, in the US, bonds are not traded on an formal exchange, are thus considered over-the-counter securities. Most debt instruments are traded by investment banks making markets for specific issues. If someone wants to buy or sell a bond, they call the bank that makes the market in that bond and asks for quotes. The broker/dealer negotiate directly with one another over computer networks and by phone. Bonds tend to trade infrequently, making the bid-ask spread larger. Currently, there are formal exchanges providing or maintaining a marketplace for stocks, options, futures, commodities, or currencies, but not for bonds or unique fixed rate financing instruments. There is need for formal exchanges for bonds or unique fixed rate financing instruments

SUMMARY OF THE INVENTION

The present invention intends to provide bonds to be issued for the purpose of acquiring private funds to be invested in public works such as infrastructure improvements so that infrastructure improvements can be implemented even under a tight financial condition.

It is another object of the invention to provide a novel method of issuing a new financial product different, from stocks and bonds, that will provide investors who trade stocks and bonds with a new chance of earning profits by creating and marketing a financial instrument that provides for partial guarantee of a security by a third party.

It is a purpose of this invention to provide a new financial instrument which does not specify the redemption date although the dividend, interest and guaranty are stated, thus providing a new means for enterprises to obtain funds more easily, and a new financial product for investors, different from stocks and bonds, for earning profits through transactions, as well as a new market forming method for the new financial instrument.

It is a purpose of this invention to provide a market place for the general public to directly purchase bonds or a newly-issued fixed rate financing instrument.

The present invention provides a means of issuing bonds related to project financing, where projects are public works such as infrastructure improvement projects. A person who wishes to purchase such a bond is able to see the contents of the public works to which the person is investing. Since the person can select the public works at will, in which his/her money is to be invested, this method enhances his/her desires for purchasing the bonds. Moreover, since the person's investment will never be used in public works to which he/her objects, the investor can purchase bonds with more confidence.

The present invention provides a private enterprise trying to execute public works such as infrastructure improvement projects a means of acquiring large sums of funds from private sectors to be invested into the public works such as infrastructure improvement projects through bond issuing. This is because those who are buying bonds can be assured for the repayment as the principal and interests repayment liabilities of the bond issuers are warranted to certain fixed limits by a national or local government so that the bond buyers are guaranteed to be able to collect the principal and interests safely to certain fixed limits even when the a private enterprise fail in the operation of the public works. The owner of the securities issued under the present invention may be eligible for dividends, besides interests.

The securities issued according to this invention are a new kind of financial product which did not exist before. This product encourages people who have never bought securities to buy securities. Therefore, the invention can create a new financial market.

Furthermore, the owner of the securities is guaranteed for the repayment of the principal of the funds provided to the business operator by the Government of Japan, a public entity, or a private enterprise of Japanese nationality, as well as the government of a foreign country, or a public entity of foreign nationality either singularly by one of them, or jointly by two or more of them within a predetermined limit, if the business operator who issued the securities becomes unable to pay interests in accordance with the interest wording due to bankruptcy or poor business.

Moreover, the present invention provides a means of preventing the national and local governments from wasting tax money, because the national or local government's warrant for the bond issuers' principal and interest repayment liabilities are limited to certain levels that are determined fairly by an independent public organization. Thus, the national or local government are not obliged to bear the full amounts of the bond issuers' principal and interests repayment liabilities when the operations of public works such as infrastructure improvement projects by a private enterprise fail as in the case of government guaranteed bonds. Furthermore, since the present invention encourages those who have never bought bonds to buy bonds, it forms a new bond market.

An embodiment of the invention includes a method for forming a new market capable of making a person who has never purchased securities purchase securities issued by using the system, and trade those securities in the market as needed.

In an embodiment of the invention a server includes a means for transmitting information an offer, indicating securities available to the client and a means for receiving a bid or an offer to purchase securities. The server also has software capable of market making or creating an authorization to issue securities based, in part, on the bids or offers to purchase securities received from the client. The server also has means for receiving individual user identification information and user institution identification information. The server is also capable transmitting and authorization including the individual user identification information and the authorization to issue securities to the securities issuing machine. The server also has means for receiving a confirmation of the issue of securities from the securities issuing machine, accumulating a total of the securities confirmed as issued and calculating fees to charge the user institutions.

In the embodiment of the invention, the client means for transmitting the bid or offer to purchase securities to the server identification information about both the individual user the user institution to the server.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein:

FIG. 5 shows a table of three kinds of fixed rate financing instruments of the invention including the one for an Odaiba Casino Project.

FIG. 6 shows a table of three kinds of fixed rate financing instruments of the invention including the one for a Japanese Highway Project.

FIG. 7 shows a table of two kinds of fixed rate financing instruments of the invention.

DETAILED DESCRIPTION OF THE PREFERRED EMBODIMENTS

Figure 1:
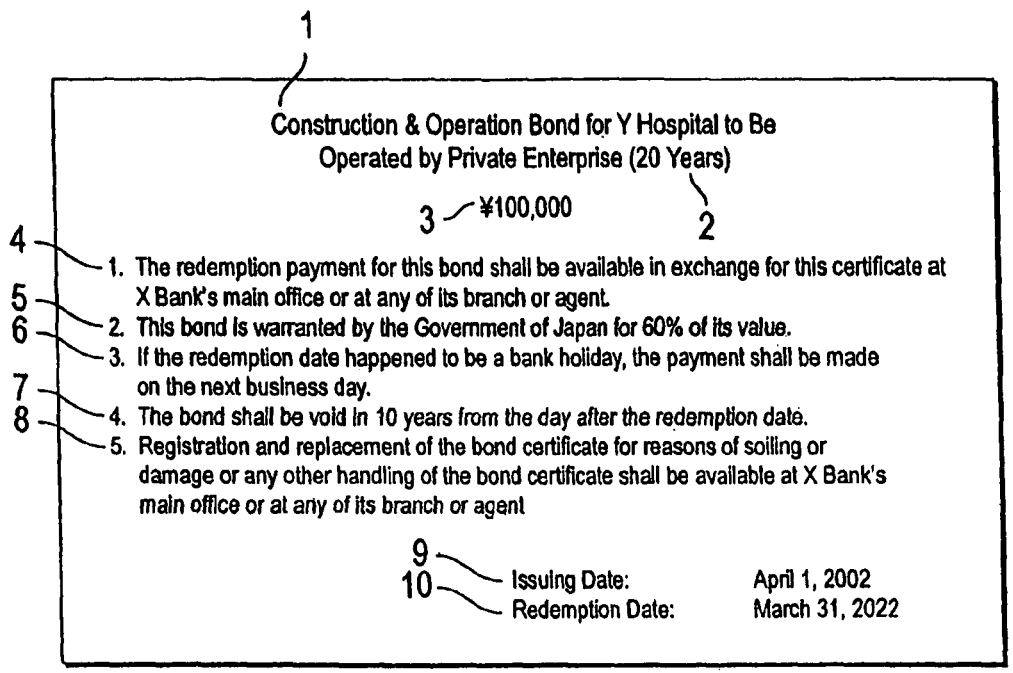
FIG. 1 is a view of a bond certificate according to an embodiment of the present invention.

In order to more clearly and concisely describe the subject matter of the claims, the following definitions are intended to provide guidance as to the meanings of specific terms used in the following written description. Also it is to be understood that the phraseology or terminology employed herein is for the purpose of description and not of limitation. As used herein:

"A fixed rate financing instrument" of the invention: A fixed rate financing instrument issued by a corporation, government, or other organization which offers evidence of debt or equity, and pay a fixed interest rate and/or dividend. Such debt instrument, that obligates the issuer to pay to the bondholder the principal (the original amount of the loan) plus interest, is not secured by any property but only secured by the issuing entity's promise to pay. The instrument may be partially guaranteed by public entities. The unique "fixed rate financing instruments" of the invention either have a maturity date for only part of the debt (See "Odaiba Casino" Project in FIG. 5), or have no maturity date at all (See "Japanese Highway" Project in FIG. 6) such that they may be subject to the US Securities Exchange Act of 1934, although they were not explicitly defined under the law. The official definition of securities under the Securities Exchange Act of 1934 is: "Any note, stock, treasury stock, bond, debenture, certificate of interest or participation in any profit-sharing agreement or in any oil, gas, or other mineral royalty or lease, any collateral trust certificate, pre-organization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited."

A "Dividend of the fixed rate financing instrument" is the distribution of an amount of profits of operation to a holder of the fixed rate financing instrument of the invention. The money amount of the dividend may be defined as a fixed amount of the operation profits (e.g., as soon as the operation profits reaching a target amount until a pay-off day similar to an amortization pay-off day of a traditional bond). The money amount of the dividend may also be defined as a variable amount, such as a percentage of the operation profits (e.g., since the day of operation), or a combination with a fixed amount of the profits. The dividend of the fixed rate financing instrument of the invention is essentially different from a conventional dividend to a stockholder which is the distribution of profits to a company's shareholders, usually paid quarterly.

"Public works" and "public projects": works constructed for public use, benefit, or enjoyment, especially when financed and owned by a government or a public entity. Sometimes a government will take recourses to such measures in times of economic recession, as a form of "pump priming," under the belief that borrowing money and spending it on the wages and materials needed for public works will improve the economy. Public works were a major part of the New Deal in the 1930s that pulled the U.S. out of the Great Depression. The terms according to the invention include not only public works in the conventional sense, i.e., public works that are planned solely by a national or local government and executed solely by a national or local government, but also public works that are planned solely by a private enterprise and executed solely by a private enterprise; public works that are planned solely by a national or local government and executed solely by a private enterprise; public works that are planned solely by a private enterprise and executed solely by a national or local government; public works that are planned solely by a national or local government and executed jointly by a national or local government and a private enterprise; public works that are planned solely by a private enterprise and executed jointly by the a national or local government and a private enterprise; public works that are planned jointly by a national or local government and a private enterprise and executed solely by a national or local government; public works that are planned jointly by a national or local government and a private enterprise and executed solely by a private enterprise; and public works that are planned jointly by a national or local government and a private enterprise and executed jointly by a national or local government and a private enterprise. Examples of public works include highways, docks, airports, canals, dams, dikes, pipelines, railroads, roads, tunnels, artificial harbors, mines, schools, hospitals, water purification and sewage treatment centers, etc.

A "fixed rate public work financing instrument" is a fixed rate financing instrument of the invention which is dedicated for financing public works and issued by a corporation, government, or other organization which offers evidence of debt or equity.

"Infrastructure improvement projects": include constructions and operations of public facilities such as roads, railways, harbors, airports, rivers, parks, public water supply systems, public sewage systems, and public industrial water supply systems; constructions and operations of facilities for government uses such as government buildings and housings; constructions and operations of facilities for public benefits such as public housings, educational and cultural facilities, waste processing facilities, healthcare facilities, social benefit facilities, welfare facilities, parking facilities, and underground commercial facilities; constructions and operations of information and communication facilities, heat energy supply facilities; new energy facilities; recycling facilities (except waste processing facilities), sightseeing facilities, and research facilities; and constructions and operations of commercial buildings annexed to railway stations and other commercial buildings.

"Third parties to issuance" are anyone except the executors/debtors and the buyers/holders of the fixed rate financing instruments of the invention. The third parties to issuance may be public or private entities, for profit or non-profit entities, financial or non-financial entities, such as the World Bank, the Asian Development Bank, the Japanese Export Credit Agency (JBIC), the Tokyo Electric Power Company, the Multilateral Investment Guarantee Agency, the Nippon Export and Investment Insurance, the Catholic Church, etc.

"Terms" of a fixed rate financing instrument of the invention are a set of features, requirements, symbols and terminology regarding technical and quality characteristics of the financing instrument. The terms include, but are not limited to, name and contents of the public work (e.g., locations of performance, delivery of services, deadline(s) for completing the public work); executor(s) of the public work; issuer and/or underwriter; face value; terms of payment of interest/dividend; grantor; percentage of guarantees by third parties to the issuance; redemption period/date and location; retirement date; and combinations thereof; etc.

Figure 2:
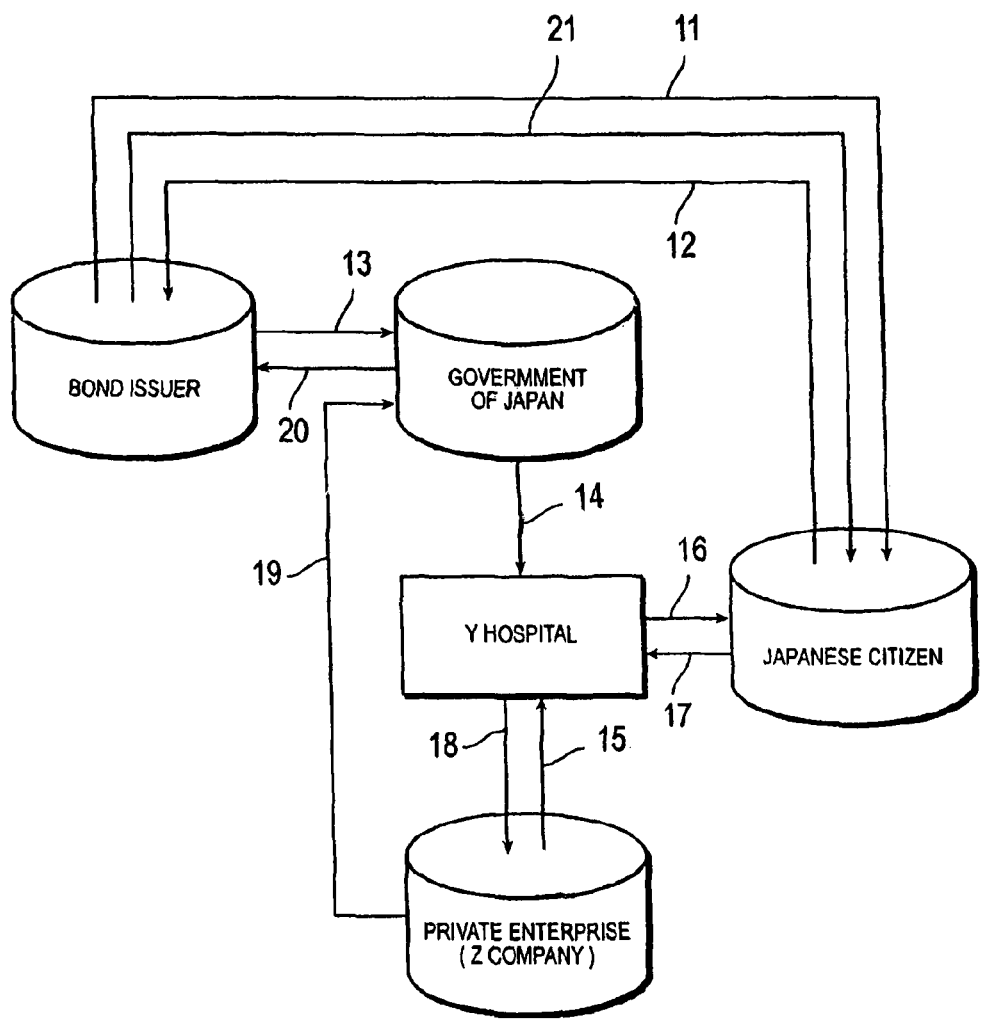
FIG. 2 is a diagram showing development and operation of a public work (hospital) using the bond according to the embodiment of the present invention.
Figure 3:
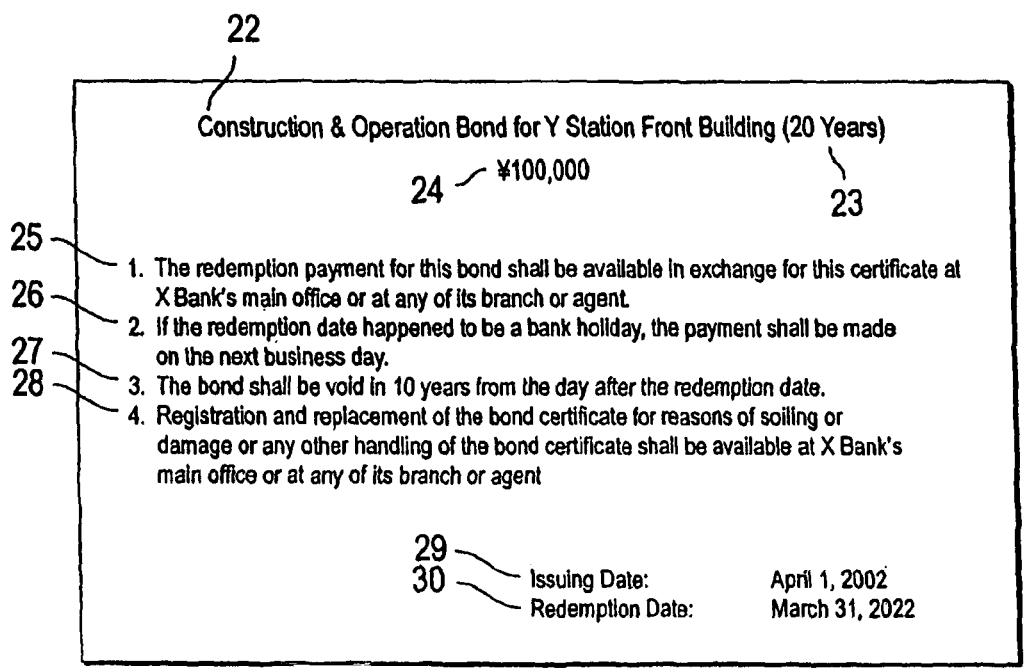
FIG. 3 is a view of an example of bond certificate based on the SPC Law.
Figure 4:
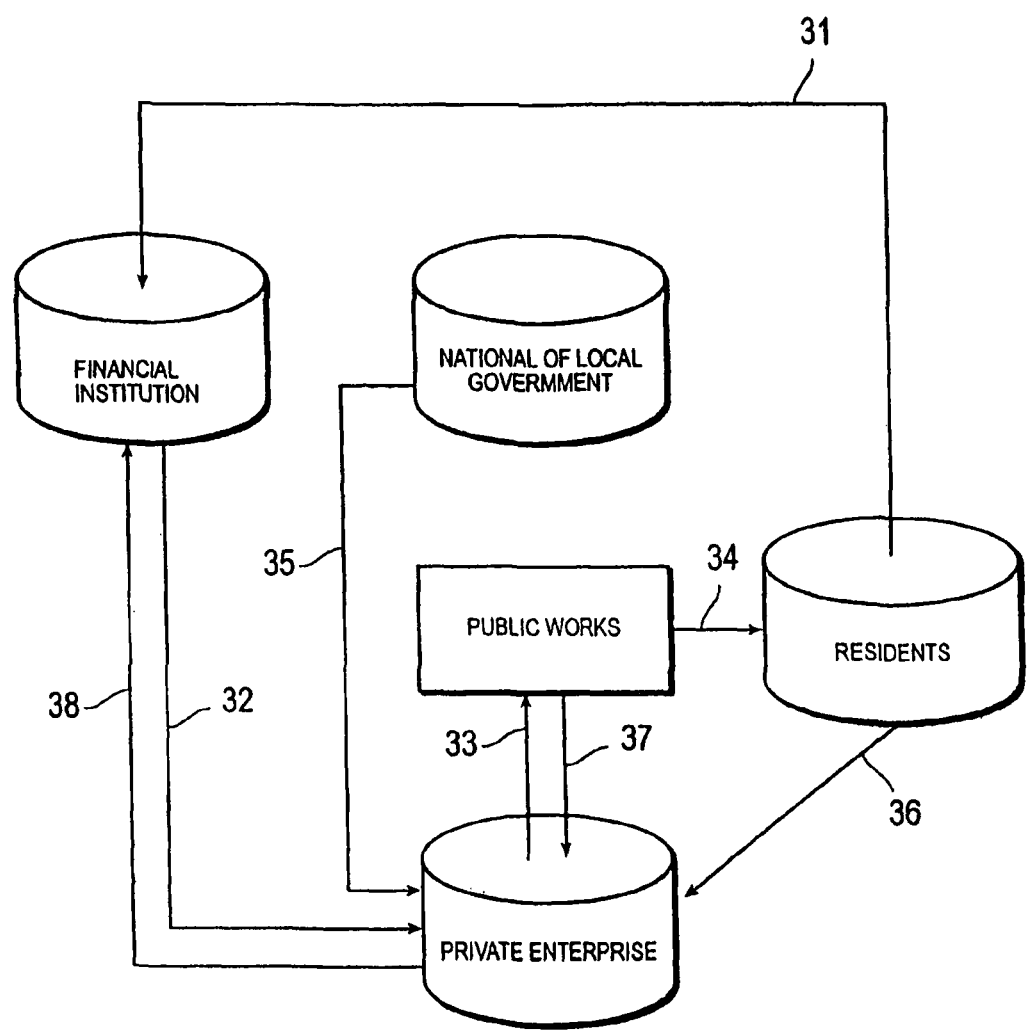
FIG. 4 is a diagram showing the scheme of PFI.

FIG. 1 is a view of a bond certificate according to an embodiment of the present invention. On the face of the bond certificate according to the present invention, a wording 1 of "Construction & Operation Bond for Y Hospital to Be Operated by Private Enterprise," a wording 2 of "20 Years," a wording 3 of "¥100,000," a wording 4 of "The redemption payment for this bond shall be available in exchange for this certificate at X Bank's main office or at any of its branch or agent," a wording 5 of "This bond is warranted by the Government of Japan for 60% of its value," a wording 6 of "If the redemption date happened to be a bank holiday, the payment shall be made on the next business day," a wording 7 of "The bond shall be void in 10 years from the day after the redemption date," a wording 8 of "Registration and replacement of the bond certificate for reasons of soiling or damage or any other handling of the bond certificate shall be available at X Bank's main office or at any of its branch or agent," a wording 9 of "Issuing Date: Apr. 1, 2002," and a wording 10 of "Redemption Date: Mar. 31, 2022" are written. FIG. 2 is a diagram showing the development and operation of the public work (hospital) using the bond according to the embodiment of the present invention. The bond according to the embodiment of the present invention will be described below in detail referring to FIG. 2.

The wording 1 of "Construction & Operation Bond for Y Hospital to Be Operated by Private Enterprise" indicates that this bond is a bond according to the embodiment of the present invention. The wording 1 clarifies that the bond is related to operation by a private enterprise 15 (provides healthcare services to Japanese citizens 16 and collects healthcare fees 18). The wording 1 also clarifies that the bond is a bond issued with an intention of acquiring funds (11) for the construction of Y Hospital (14).

Therefore, a Japanese citizen who is buying (12) the bond can clearly understand from the wording 1 that the funds being acquired by the bonds are invested (13) strictly into the construction of the Y Hospital (14). Thus, the Japanese citizen who is buying the bond can have a clear sense that "my money will be invested for the construction of Y Hospital."

The role of the Government of Japan in FIG. 2, therefore, can be replaced by any trusted entity, such as but not limited to, a public or private entity of Japan, the government of a foreign country, a public or private entity of foreign nationality, either singularly by one of them or jointly by two or more of them.

The role of the private enterprise in FIG. 2, therefore, can be replaced by the trusted entity, which may for instance be, but is not limited to, the Government of Japan, a public or private entity of Japan, the government of a foreign country, a public or private entity of foreign nationality, either singularly by one of them or jointly by two or more of them.

Thus, according to this bond, contrary to other bonds where the buyers are not aware of what purposes the investments are used, the use of the funds acquired by the bond is clear so that the bond buyers' confidence can be enhanced, the bond buyers' desire for purchase can be increased, and ultimately promote investment of private funds to public works (13).

The wording 2 of "20 Years" indicates that the principal and the interest shall be redeemable (21) in 20 years from the issuing date. The wording 3 of "¥100,000" indicates the amount of fund (12) obtained by the issue of this bond. The wording 4 of "The redemption payment for this bond shall be available in exchange for this certificate at X Bank's main office or at any of its branch or agent" clarifies the locations of redemption. The wording 4 also clarifies that the principal and interest are paid in exchange for the bond certificate.

The wording 5 of "This bond is warranted by the Government of Japan for 60% of its value" clarifies that the Japanese government warrants (20) the bond issuer's principal and interest repayment liabilities to the Japanese citizen (buyer) within a certain limit. Although Z Company is liable to pay (19) to the bond issuer the cost of development of Y Hospital and its interest from the profit and revenue earned from the operation of Y Hospital (18) through the Japanese government, the operation of Y Hospital can deteriorate or fail.

However, the wording 5 warrants that 60% of the principal to be repaid by the bond issuer to the Japanese citizen (buyer). Thus, contrary to the bond based on the SPC Law, the bond buyers' confidence can be enhanced, and ultimately promote investment of private funds to public works (12). The warranty (20) by the Japanese government of the bond repayment liability is limited to a certain amount. Therefore, the Japanese government is not required to warrant the entire amount of the bond's principal and interests according to this bond.

The wording 6 of "If the redemption date happened to be a bank holiday, the payment shall be made on the next business day" clarifies the payment shall be made on the next business day as it is not clear when the payment (21) of the principal and the interest will be made if the redemption date falls on a bank holiday.

The wording 7 of "The bond shall be void in 10 years from the day after the redemption date" clarifies that the bond shall be void (21) after a period.

The wording 8 of "Registration and replacement of the bond certificate for reasons of soiling or damage or any other handling of the bond certificate shall be available at X Bank's main office or at any of its branch or agent," clarifies how the bond certificate is handled in case of need for registration and replacement of the bond certificate for reasons of soiling or damage.

The wording 9 of "Issuing Date: Apr. 1, 2002" clarifies the issuing date (11). The wording 10 of "Redemption Date: Mar. 31, 2022" clarifies the redemption date (21).

The abovementioned bond is according to one of the embodiments of the present invention. Therefore, the bonds according to the present invention are not limited to the abovementioned bond. For example, the wording 1 can be anything as long as the particular bond is a bond related to a certain project finance, for example, they can be "Construction Bond for T Road Operated by Private Enterprise," "Construction Bond for R Senior Citizen's Home," and "Construction & Operation Bond for W Public Housing Project."

Moreover, the degree of warranty of repayment liabilities by the national government indicated in the wording 5 is not limited to "60%" but rather can be any degree or ratio warranted by the a national or local government, for example, 10, 20 or 50%. Further, the entity that warrants the repayment liabilities in the wording 5 does not have to be "Japan," but rather can be any arbitrary country in the world such as U.S., China, Korea, and U.K.

Furthermore, the warranting government in the wording 5 can be an arbitrary local government(s) in the world such as Tokyo, Osaka, Los Angeles, and Beijing. The buyer of the bond according to the invention is not limited to a Japanese citizen. A citizen of an arbitrary country of the world, such as a U.S., Chinese, Korean and U.K. citizen can be a buyer of the bond according to the invention.

The "bond issuer" can be a foundation for urban development, or a similar entity.

According to the present invention, those who are buying bonds can be assured for the repayment as the principal and interests repayment liabilities of the bond issuers are warranted to certain fixed limits by a national or local government so that the bond buyers can have more confidence in buying the band as they are guaranteed to be able to collect the principal and interests safely to certain fixed limits even when the a private enterprise fail in the operation of the public works.

As such, it is obvious that the redemption claim materializing after the due date for a bond issued according to the present invention is backed by strong credibility. Therefore, the present invention can be an effective means of cultivating unutilized funds held by private investors or citizens by providing unique bonds.

Each of the fixed rate financing instruments of the invention shown in FIGS. 5-7 is partially guaranteed by one or more guarantors to provide protection to investors. The prior art guaranty for a debt covers 100% of all principal and interest amount of debt. However, the fixed rate financing instruments of the invention only guarantee between 0-100%, preferably 50% to 80%, of the total principal and outstanding interest. Where a debt is under guaranty by a guarantor, its legal nature is strongly assumed to be a debt, but the remaining part of obligation not under such guarantee can be characterized as "security" which has nature of equity as long as it is not under 100% of guarantee.

Most of the listed fixed rate financing instruments of the invention in FIGS. 5-7, such as the one for the "ODAIBA CASINO" (with a redemption period 10 years and an annual interest rate 3%), the one for the "NUMAZU MUNICIPAL HOSPITAL" (with a redemption period 5 years and an annual interest rate 2%), the one for the "SAITAMA STATION FRONT BUILDING" (with a redemption period 8 years and an annual interest rate 2.5%), the one for the "STOMACH CANCER SUPPRESSANT DEVELOPMENT PROJECT" (with a redemption period 10 years and an annual interest rate 2.5%), the one for the "XX SATELLITE PROJECT" (with a redemption period 6 years and an annual interest rate 2%), the one for the "YY OIL FIELD PROJECT" (with a redemption period 10 years and an annual interest rate 5%), and the one for the "ZZ NATURAL GAS PROJECT" (with a redemption period 9 years and an annual interest rate 2.5%), have legal nature of debts, since each of them is stipulated with a redemption period (from 5 to 10 years) and an annual interest rate (from 2-5%) for periodically interest payments before a redemption date.

For example, in the "ODAIBA CASINO" project, before the completion of the Casino, the proceeds from selling the "3% ODAIBA CASINO Construction & Operation Bonds" according to the invention (although named as bonds, it is a fixed rate financing instrument of the invention) are used to pay for the construction cost and the interests to the instrument holders (directly or via a facilitator/underwriter of the instrument). After the completion of the Casino, the revenues and profits generated by the Casino continue to pay for the interests to the instrument holders. On the date of redemption, the accumulated profits generated by the Casino pay off the principal of the ODAIBA CASINO Construction & Operation Bonds. If the proceeds from selling the ODAIBA CASINO Construction & Operation Bonds are not sufficient to pay for the interests to the instrument holders during construction, or if the revenues and profits generated by the Casino are not sufficient to pay for the interests to the instrument holders during the operation of the Casino, or if on the redemption date, the accumulated profits generated by the Casino are not sufficient to pay off the principal/face value of the Bonds, the executors are 100% liable for paying the due interests or principal to the instrument holders. However, if they default, the grantor which guarantees 70% of interest payments for 10 years as well as 70% of principal at redemption, has to pay 70% of any due interest and principal and/or according to the terms stipulated on the back of the Bonds. The remaining 30% debt is not guaranteed by any other third parties, thus still has to be paid by the executors/debtors out of revenues, assets, etc. based upon negotiation between the holders and the debtors or any applicable bankruptcy proceedings. The Terms and Conditions of the ODAIBA CASINO Construction & Operation Bonds are listed in Table 1.

TABLE 1

Terms and conditions
4 Apr. 2004
Description
1. 3% ODAIBA CASINO Construction & Operation Bonds ("Bonds") are a private security issued under the Japanese Law concerning Promotion of Improvement of Public Facilities 19XX for the Executors of the construction and operation of the ODAIBA CASINO. Bonds are registered on the National Savings Stock Register and are subject to The Japanese Law concerning Promotion of Improvement of Public Facilities 19XX as amended or re-enacted from time to time. In the event of any differences between these terms and conditions and the Regulations, the Regulations will prevail. THE BONDS ARE NOT OBLIGATIONS OF THE UNITED STATES GOVERNMENT, BUT ARE 70% GUARANTEED BY THE UNITED STATES GOVERNMENT.
2. In these terms and conditions:
(a) "Executors" include the Metropolis of Tokyo and the following management companies in Las Vegas, USA;
(b) "SAKURA" means Sakura Bank operating through its Tokyo office or such other office as SAKURA may specify;
(c) "post office" means a branch of Post Office Ltd in Japan.
Interest
3. Bonds earn interest at 3% fixed rate for a specified period of 12 months starting from the date of investment. We call each period of time a "term". Each term will have its own "Issue" of Bonds issued in sequence (e.g., 1, 2, 3, etc) and the same rate apply to each Issue of each term.
4. The rate earned by a Bond of a particular Issue will be determined by:
(a) its capital value at any time - the original investment plus any interest added to the Bond (see paragraph 7) less any repayment;
(b) whether you choose to have interest paid or added to the Bond annually or monthly (see paragraphs 9 and 10).
5. Any Issue of Bonds can be withdrawn from sale without notice. An application can only be accepted for the Issue on sale on the date of investment (see paragraph 18).
6. Subject to paragraphs 25 and 36 interest is earned for each day your Bond is held on the value of your Bond at the end of that day. This includes the date of investment but not the date you cash in your Bond. Interest is earned on a daily basis at 1/365 of the annual interest rate for each day (or 1/366 for each day in a calendar leap year).
Payment of interest
7. We will normally add any interest earned to the Bond. It will then form part of the capital value of the Bond and earn further interest unless the Bond is cashed in.
8. Alternatively, you can request on your application for the interest to be paid by direct credit to a bank account. SAKURA intends to use the Bankers' Automated Clearing Service (BACS) for this purpose so the account nominated on the application must be capable of receiving payment by this method.
When interest can be paid
9. We will normally add the interest to your Bond or pay it to your account annually on the anniversary of the date of investment and, if the term is not for one or more complete years (e.g., 18 or 30 months etc), at the end of the term. Interest on Bonds with a term of less than one year will normally be added or paid at the end of the term.
10. Alternatively, you can request on your application for the interest to be added to your Bond or paid to your account monthly on the same date each month as the date of investment TABLE 1-continued (e.g., if the date of investment is the 10th of a month the interest will be added or paid on the 10th of each subsequent month) until the Bond is cashed in.
11. If the interest is to be paid to a bank account and the due date falls on a weekend or bank holiday your account may not be credited until the next working day.
Tax
12. JP Income Tax at the rate prescribed by law will be taken off the interest before it is added to your Bond or paid to your account. A certificate of tax deduction will be sent to you shortly after the end of each tax year at your last recorded address for the Bond.
Who may invest in Bonds
13. Individuals aged 18 years or over. You may invest in Bonds:
(a) in your own name; or
(b) jointly with one other individual who is also aged 18 years or over.
You may hold more than one Bond in either or both of these categories.
14. Trustees. You may invest in Bonds as a trustee either solely or jointly with one or more other trustees. Corporate trustees may also invest in Bonds. The Trust may have up to two beneficiaries (but a beneficiary whose interest only takes effect on the death of another beneficiary is disregarded for the purpose of this limit). Beneficiaries must be individual persons and can be of any age.
15. Receivers. A receiver may invest in Bonds on behalf of and in the name of a mentally disordered person of any age.
16. General. You may not invest in Bonds:
(a) if you are under 18 years of age;
(b) for the benefit of another individual, except as permitted by paragraphs 14 or 15;
(c) if you are under a legal disability.
How to invest
17. You may invest in a Bond by applying via the internet, by telephone or by post to SAKURA; or in person at any post office which carries out SAKURA business. Where you apply via the internet or by telephone and this is your first investment in Bonds, you must confirm your application by signing and returning a confirmation form we will send to you by post. We may also write to you requesting documentary evidence of your identity and address. The form and/or letter requesting evidence of identity will specify the time within which the signed form and/or evidence must be returned to SAKURA. If the form and/or evidence is not received at SAKURA within the specified time SAKURA will not be able to accept your application.
18. In all cases, an application to invest is subject to acceptance by SAKURA: where you apply at a post office, acceptance can only occur when the application is subsequently processed by SAKURA. If accepted the date of investment will be:
(a) for applications sent by post, the date your application and payment were received at SAKURA;
(b) for applications via the internet, the date your on-line application, including authority for a debit card payment, were received at SAKURA.
(c) for applications made by telephone, the first date by which SAKURA took the details of your application, including authority for a debit card payment;
(d) for applications at a post office, the date your application and payment were received at the post office.
19. Because Bonds of more than one term may be available at any one time, you must specify your choice of term on the application form.
20. Unless you specify otherwise on your application form, interest on your Bond will:
(a) be added to your Bond - not paid to a bank account (see paragraphs 7 and 8);
(b) be added or paid annually on the anniversary of investment and at the end of the term - not monthly (see paragraphs 9 and 10).
21. We will send you a certificate of investment showing the value and date of investment.
Investment and holding limits
22. The minimum you can invest in a Bond is 1,000,000 yens. Face values of the Bond include 1, 5, 10, 50 and 100 million yens.
23. You may not invest in a Bond if immediately after that investment you would hold, whether solely or jointly with another person, more than 1,000,000,000 yens in Bonds. The holding limit will not prevent the addition of interest but interest that has been added will count towards this limit if you wish to invest in a further Bond.
24. Bonds you inherit from a deceased holder will not count towards the maximum limit. Bonds you hold as a trustee will not affect the amount you may hold for yourself, nor will Bonds held in trust for a beneficiary count towards the maximum limit of that beneficiary's personal holding. Although the maximum limit applies to trust holdings, each trust is treated separately.
Cashing in
25. Bonds can be cashed in at any time, but, except where paragraph 26 applies, the equivalent of 90 days interest on the sum requested at the rate your Bond is earning on the day before the day you cash in will be deducted from the amount to be cashed in. This also applies to Bonds held for less than 90 days.
26. No penalty will be charged:
(a) if you cash in at the end of the term or at the end of any subsequent term (see paragraph 36) and your instructions are received by the end of that term;
(b) where an instruction to cash in is made after the death of a sole, or last surviving, registered holder;
(c) where the Bond is registered as held in trust and the instruction to cash in is made after the death of a sole, or last surviving, beneficiary.
27. Part of a Bond may be cashed in under paragraphs 25 and 26. There is no minimum limit for repayments but at least 1,000,000 yens, excluding interest which has not yet been added, must remain invested in the Bond. The Treasury may bring in a minimum limit upon giving written notice to bondholders. A replacement certificate of investment, retaining the original TABLE 1-continued date of investment, will be issued for the remaining balance.
28. Instructions to cash in should be made by completing the form on the back of the certificate of investment and sending it to SAKURA. It may be difficult to prevent an interest payment from being made after the last date on which interest is earned. If so any overpayment will be deducted instead from the amount to be cashed in.
29. The amount due when a Bond or part of a Bond is cashed in will be rounded to the nearest penny.
Payment
30. Payment will normally be made by direct credit to a bank account you nominate on the instructions to cash in. SAKURA intends to use the Bankers' Automated Clearing Service (BACS) for this purpose, but reserves the right to use a different means of electronic transfer.
31. For the purpose of determining the amount payable, the date a Bond or part of a Bond is cashed in will:
(a) where the Bond is cashed in at the end of the term, be taken to be that date regardless whether payment is delayed until the next banking day because the date falls on a weekend or bank holiday;
(b) in any other case, be taken to be the date on which, in the normal course, the requested amount would be credited to the nominated account following initiation of the electronic transfer by SAKURA.
32. Where SAKURA initiates an electronic transfer properly, neither he nor the Treasury will be liable for:
(a) any failure or delay of the receiving bank in crediting the nominated account;
(b) any failure or delay in any part of the electronic transfer process which is beyond SAKURA's direct control; including any failure which occurs because the specified account is incapable of receiving an electronic transfer.
33. In exceptional circumstances payment can be requested by crossed warrant (like a check). In such cases the date a Bond or part of a Bond is cashed in will be taken to be the date on the warrant.
Transfers
34. You can only transfer your Bond or part of a Bond with the consent of SAKURA. SAKURA will, for example, normally give consent in the case of the inheritance of Bonds on the death of a holder but not to any transfer which is by way of sale.
35. SAKURA will not normally consent to a transfer:
(a) of less than 1,000,000 yens in Bonds;
(b) if the transferor(s) would as a result hold, whether solely or jointly, less than 1,000,000 yens in Bonds;
(c) if the transferee(s) would as a result hold, whether solely or jointly, more than 1,000,000,000 yens in Bonds.
Retention after the fixed rate term
36. After the original term (or any further term for which interest is earned under this paragraph), a Bond may be eligible to earn interest for a further term of the same length. The Treasury will decide whether this will apply and, if so, on what terms as to interest. SAKURA will write to the holder, at the last recorded address for the Bond, shortly before the end of each term to tell them of the Treasury's decision. If a Bond is eligible for a further term the rate of interest will be applied automatically and will be guaranteed for the whole of the further term. The arrangements for paying or adding interest will remain as for the previous term. Of course, the holder will remain free to cash in the Bond at any time (including for reinvestment into another Issue or another SAKURA product) under the normal rules for cashing in as set out in paragraphs 25 and 26.
Maturity
37. The Bonds will mature and shall be payable in full on Apr. 3, 2014 (the "Maturity Date").
Law and jurisdiction
38. These terms and conditions and any agreement made on the basis of them will be governed by and interpreted in accordance with Japanese law.
39. Subject to paragraphs 40 and 41, the courts of Japan are to have exclusive jurisdiction to settle any dispute (including claims for set off and counterclaims) which may arise in connection with these terms and conditions or any agreement made on the basis of them and which, subject to the Regulations, falls to be determined by a court of law.
40. Paragraph 39 is included for the benefit of SAKURA. Accordingly SAKURA retains the right to bring proceedings in any other court which has jurisdiction to whose jurisdiction the holder irrevocably submits.
3% ODAIBA CASINO Construction & Operation Bonds
Sakura Bank Ltd.
Tokyo
4 Apr. 2004

TABLE 2

Terms and Conditions
Terms and Conditions attached to and forming part of the Bond Certificate dated Apr. 1, 2002 issued in respect of the 3% Japanese Tomei Highway Construction & Operation Bonds.
Status
  1. The 3% Japanese Tomei Highway Construction & Operation Bonds represented by a single fully registered bond certificate in the aggregate principal amount of _____ dollars ($) (the "Bonds") issued by the Japan Highway Public Corporation ("JHPC") under the Japanese Law concerning Promotion of TABLE 2-continued Improvement of Public Facilities 19XX. JHPC is issuing the Bonds on its own behalf and not as an agent of the Japanese Government. Recourse under the Bonds is solely to JHPC and there is no recourse to the Japanese Government. THE BONDS ARE NOT OBLIGATIONS OF THE JAPANESE GOVERNMENT, BUT ARE 60% GUARANTEED BY THE JAPANESE GOVERNMENT.

Ownership Eligibility

2. The Bonds may only be purchased or held by:
    a. a beneficial owner who is at the time of acquisition:
        1. an individual normally residing in Japan and having an Japan address;
        2. a corporation, society, non-profit association or other organization having a permanent establishment in Japan;
    b. a trust governed by a Registered Retirement Savings Plan where the annuitant meets the requirements of (a)(i) above, or a Registered Education Savings Plan where all of the beneficiaries meet the requirements of (a)(i) above; or
    c. an estate or other trust where all of the beneficiaries meet the requirements of (a)(i) above or (a)(ii) above.

Registrar and Form of Bonds

3. JHPC shall cause to be kept a legal register (the "Legal Register") which deems necessary and of all transfers and cancellations of the registered Bonds. SAKURA Bank has been appointed by JHPC as registrar, fiscal agent, transfer agent and paying agent and as depository and custodian for the Bonds pursuant to an agreement dated as of Apr. 22, 2003 between JHPC and the Registrar. The Registrar shall establish and maintain the Legal Register.

4. Bonds shall be issued in "book entry only" form under a registration system to be established and maintained by the Registrar pursuant to the Registrar and Paying Agency Agreement and shall be represented by a single fully registered bond certificate (such certificate and any certificate or certificates issued in replacement or substitution therefore, the "Single Bond") registered in the name of the Registrar or its nominee in the Legal Register and held by or on behalf of the Registrar.
The Registrar is acting as nominee and not as a trustee for the holders of all Bonds represented by the Single Bond registered in its name. Except as otherwise expressly provided herein, the Registrar shall not be entitled to exercise any of the rights of a holder of the Bonds; provided, however, that the Registrar, in its capacity as Depository, shall receive and hold payments from JHPC on the Single Bond for the benefit of the holders of the Bonds and shall disburse such payments to such holders of the Bonds, inclusive, of these terms and conditions and in the Registrar and Paying Agency Agreement. For certainty, the Registrar shall have no obligation or liability to enforce any rights or remedies of a holder of the Bonds on behalf of such holder and each holder may enforce its rights and remedies under the Bond in accordance with Section 8 hereof.

5. Pursuant to the Registrar and Paying Agency Agreement, the Registrar shall establish and maintain, on behalf of JHPC, a book entry register (the "Book Entry Register") in the City of Tokyo of the names and addresses of the holders of all Bonds represented by the Single Bond (which initially, shall be comprised of the Japanese Depository for Securities Limited ("JDS") and all persons and entities who purchased Bonds directly from JHPC and not through participants of JDS) (all such holders of Bonds recorded in the Book Entry Register are hereinafter referred to as "Holders") and particulars of their respective interests and of all transfers and cancellations of the Bonds. For such Holders, Bonds shall be evidenced solely by entries made in the Book Entry Register. Ownership statements may be issued by the Registrar ("Ownership Statements") to purchasers of the Bonds and their transferees in such form or forms as may be agreed upon between JHPC and the Registrar but in the event of a conflict or discrepancy between the Book Entry Register and an Ownership Statement, the Book Entry Register shall govern. No purchaser, holder or transferee of a Bond shall be entitled to receive a bond certificate or any other instrument representing an interest in the Bonds; provided, however, that a Holder (but not an Indirect Holder) shall be entitled to receive an Ownership Statement as to its interest in the Bonds upon written request to the Registrar (at no cost or expense to such Holder so long as the request permits the Registrar to provide such Ownership Statement in accordance with its normal procedures). For certainty, an Ownership Statement is not a security and is not equivalent to a bond certificate.

6. JHPC has designated the Registrar to act as depository for the Bonds, and JDS to act as a sub-depository in respect of a portion of the Bonds, (the Registrar in its capacity as depository for the Bonds, together with JDS, their respective successors, or such other nationally recognized clearing agency as is designated in writing by JHPC to act as a depository or sub-depository in respect of all or any portion of the Bonds, are hereinafter collectively referred to as the "Depository" or individually, as a "Depository"). The Bonds in respect of which JDS has been designated as Depository will be recorded in the Book Entry Register in the name of JDS or its nominee and all other Bonds will be recorded by the Registrar in the Book Entry Register in the name of the Holder thereof. Interests in Bonds held through a Depository shall be subject to the following:
    a. the Registrar may deal with each Depository as the authorized representative of the persons or entities that have beneficial interests in all such Bonds including those who hold their interests in Bonds through JDS and its participants (such holders holding their interests through JDS being hereinafter referred to as "Indirect Holders");
    b. subject to Section 4 and Section 8 hereof, the rights of the Holders of such Bonds shall be exercised only through the Depository and shall be limited to those established by law, by the Registrar and Paying Agency Agreement and, TABLE 2-continued in the case of Indirect Holders, by agreements between JDS and direct participants of JDS and agreements between such direct participants and Indirect Holders, as the case may be;

c. a Depository will receive from the Registrar and (x) in the case of the Registrar as Depository, transmit distributions of principal and interest on the Bonds to the Holders, or (y) in the case of JDS as Depository, transmit distributions of principal and interest on the Bonds to the direct participants of JDS;

d. except as otherwise provided herein and except for the purposes of the Corporations Tax Act or the Japan Income Tax Act and any regulations under either of them, none of the direct participants of JDS or the Indirect Holders shall have any rights under the Single Bond or under or with respect to any of the Bonds held on their behalf by JDS, and JDS may be treated by JHPC and the Registrar and their respective agents, employees, representatives, officers and directors as the absolute owner of the Bonds recorded in the Book Entry Register in the name of JDS or its nominee for all purposes whatsoever; and e. Neither JHPC nor the Registrar shall have any responsibility or liability for any aspects of the records relating to, or payments made by, JDS on account of the beneficial interests of Indirect Holders in any Bonds registered in such Depository's or its nominee's name or for maintaining, reviewing or supervising any records relating to such beneficial interests.

7. JHPC shall be entitled to deal with the holder of the registered Bond as shown on the Legal Register for all purposes as the legal and beneficial owner of the Bonds and except as otherwise expressly provided herein, no Holder or Indirect Holder shall have any rights under the Single Bond or under or with respect to any of the Bonds held on their behalf by any Depository.

8. Notwithstanding anything to the contrary contained herein, JHPC agrees that a holder of a Bond represented by the Single Bond may exercise or elect to exercise rights in respect of its Bonds by giving written notice of such intention to the Registrar (in the case of Holders) or, in the case of Indirect Holders, to a participant of JDS who will instruct JDS accordingly. The Registrar shall forthwith provide a copy of each such written notice received by it to JHPC. In such circumstances, upon receipt of such written notice by JHPC, it will thereafter for such purposes directly recognize the standing, capacity and entitlement of such holder of a Bond to exercise such rights in the same manner as if such holder had a bond certificate representing its interest in the Bonds registered in such holder's name. Any requirement for physical delivery of a bond certificate to JHPC in connection with the exercise of such rights by a holder will be deemed satisfied when the respective ownership rights of the interest in the Single Bond are transferred, in the case of Holders, by the Registrar in the Book Entry Register or, in the case of interests held through JDS, by JDS and its applicable participant in the records of JDS, and JHPC is instructed accordingly.

Minimum and Maximum Ownership Limit

9. Bonds may be purchased only in minimum principal amounts of 1,000,000 yens. Face values of the Bond include 1, 5, 10, 50 and 100 million yens.

10. The maximum principal amount of Bonds that may be beneficially owned (whether as a Holder or an Indirect Holder) by an individual or entity in any calendar year is 1,000,000,000 yens or such other amount established by JHPC (and posted on the Japan Opportunity Bonds website at www.osifa.on.ca or announced by such other public notice as JHPC may from time to time determine) from time to time, in any calendar year (the "Dollar Limit"). The Dollar Limit shall not apply to Bonds purchased in the secondary market or by dealers acting as underwriters.

Interest & Dividend

11. The Bonds will bear interest at 3% per annum set out on the face of this Single Bond prior to a Retirement Date of the Highway. A 3% dividend to be paid before the accumulated dividend payments reach the principal has the nature of interests, while a 3% dividend to be paid after the accumulated dividend payments reach the principal has the nature of dividends. However, they are generally referred as "Interest."

12. Interest is payable on the Bonds in arrears at the rate set for the Bonds in equal semi-annual payments beginning on Apr. 1, 2002, and every April 1 and October 1 thereafter ("Interest Payment Dates") up to but excluding the earlier of (x) in the case of Bonds purchased prior to the Retirement Date of the Highway.

13. Interest on the principal amount of the Bonds shall cease to accrue on the earlier of (x) in the case of Bonds purchased by JHPC prior to the Retirement Date, and (y) the Retirement Date, unless, in each case, payment of the principal amount of the Bonds is improperly withheld or refused on such a Retirement Date, as the case may be.

14. Simple interest on the Bonds at the rate set for the Bonds will accrue on a day-to-day basis, both before and after default, Retirement and judgment, and will be calculated on the basis of a year of 365 days.

15. Interest computed for a period of less than one year, other than the computation of regular semi-annual interest, shall be calculated on the basis of the actual number of days in the period and a year of 365 days.

16. Whenever interest is computed on the basis of a year ("deemed year") that contains fewer days than the actual number of days in the calendar year of calculation, such rate of interest shall be expressed as a yearly rate for the purposes of the Interest Act by multiplying such rate of interest by the actual number of days in the calendar year of calculation and dividing such product by the number of days in the deemed year.

Transfers

17. A Holder of a Bond may at any time and from time to time have such Bond transferred at the place at which the Book Entry Register is kept. No transfer of a Bond shall be effective as against the Registrar or JHPC unless:

TABLE 2-continued a. such transfer is made by the Holder of the Bond or the executor, administrator or other legal representative of, or any attorney for, such Holder, duly appointed by an instrument in form and execution satisfactory to the Registrar and upon delivery to the Registrar of a duly executed form of transfer in form and execution satisfactory to the Registrar;
    b. such transfer is made in compliance with applicable law;
    c. such transfer is made in compliance with such other requirements as the Registrar may prescribe; and
    d. such transfer has been effected on the Book Entry Register by the Registrar.
For clarity, transfers by Indirect Holders will not be effected on the Book Entry Register.

18. The transferee of a Bond from a Holder, shall be entitled, after the appropriate form of transfer is lodged with the Registrar and upon compliance with all other conditions in that regard required by these terms and conditions or by law, to be entered on the Book Entry Register as the Holder of such Bond. No transfer fee or charge will be payable by a Holder or any transferee with respect to any such transfer.

19. The Single Bond registered in the name of the Registrar, as Depository, or a nominee of the Registrar may not be transferred except in the following circumstances:
    a. such Single Bond may be transferred by the Registrar to a nominee of the Registrar or by a nominee of the Registrar to the Registrar or to another nominee of the Registrar or by the Registrar or its nominee to a successor Registrar or its nominee; or
    b. such Single Bond may be transferred at any time after the Registrar has notified JHPC that the Registrar is unwilling or unable or no longer eligible to continue as a Depository for such Single Bond pursuant to the terms of the Registrar and Paying Agency Agreement, JHPC is unable to locate a qualified successor and accordingly, JHPC has determined that the Bonds represented by such Single Bond shall no longer be held as "book entry only" Bonds following which, Bonds in fully registered form shall be issued to the Holders of such Bonds or their respective nominees; or
    c. JHPC has determined, in its sole discretion, that the Bonds represented by such Single Bond shall no longer be held as "book entry only" Bonds following which, Bonds in fully registered form shall be issued to the Holders of such Bonds or their respective nominees.
    In case of transfers in the circumstances described in Section 19(b) and Section 19(c) above:
        1. the provisions of Section 17 and Section 18 shall apply mutatis mutandis to all transfers of Bonds in fully registered form except that the bond certificate shall accompany the duly executed form of transfer;
        2. the term "Bond" wherever used in this Bond certificate shall include and refer to all such fully registered Bonds; and
        3. the term "Book Entry Register" wherever used in this Bond certificate shall be read as the Legal Register.
All Bonds issued in exchange for a Single Bond or any portion thereof shall be registered in such names as the Depository for such Single Bond shall direct and shall be entitled to the same benefits and subject to the same terms and conditions (except insofar as they relate specifically to the Single Bond) as the Single Bond or portion thereof surrendered upon such exchange.
Every Bond authenticated and delivered upon registration of transfer of a Single Bond, or in exchange for or in lieu of a Single Bond or any portion thereof, whether pursuant to this Section 19 or otherwise, shall be authenticated and delivered in the form of, and shall be, a Single Bond, unless such Bond is registered in the name of a person or entity other than the Registrar as Depository for such Single Bond or a nominee thereof.
The certificate for the registered Bond issued to a permitted transferee shall be dated the date of its issuance and shall be substantially in the form of this Bond certificate with such amendments or alterations permitted pursuant to Section 33 hereof as the Board of Directors of JHPC may by resolution determine. Such certificate shall be signed under the seal of JHPC by any two officers of JHPC of which at least one is either the chief executive officer or the chief financial officer of JHPC and authenticated by the Registrar or successor Registrar, as the case may be.

20. Neither JHPC nor the Registrar shall be required to effect transfers of Bonds on any (x) Interest Payment Date, or (z) the Retirement Date, as the case may be, or during the fifteen (15) days preceding an Interest Payment Date, any such Retirement Date, as the case may be.

Payments

21. Payments in respect of principal and interest on the Bonds shall be made by JHPC to the Registrar no later than 10:00 a.m. (Tokyo time) on each Interest Payment Date, and the Retirement Date, as the case may be, by wire transfer of funds to an account designated in writing from time to time by the Registrar. All such payments shall be received by the Registrar, as Depository, and held by it for the benefit of the Holders in a separate account from the time of receipt until the time of payment to the Holders and be applied by the Registrar to the payment(s) due on the Bonds at the time and in the manner provided for in the Single Bond (including, without limitation, these terms and conditions). Upon receipt of any such payment by the Registrar from JHPC, the Registrar, shall, on the applicable Interest Payment Date, or the Retirement Date, as the case may be, make such payment in respect of principal or interest on the Bonds due to each Holder recorded in the Book Entry Register by direct deposit to the bank account at a Japanese financial institution specified by such Holder in writing to the TABLE 2-continued Registrar at the time of purchase or transfer of the Bonds owned by such Holder or from time to time thereafter subject to such proof or verification of identity as the Registrar may require.

For clarity, in the case of Bonds registered in the Book Entry Register in the name of JDS or its nominee, payments in respect of principal and interest on the Bonds shall be made by the Registrar to JDS, or its nominee, for payment by JDS to the Indirect Holders.

22. Payments in respect of principal and interest on the Bonds shall only be made on a day other than a Saturday, Sunday or statutory holiday in Japan (a "Business Day") and if any date for payment is not a Business Day, payment shall be made on the next following Business Day and no further interest shall be paid in respect of the delay in such payment.

23. The Registrar, as Depository and payment agent for JHPC pursuant to the Registrar and Paying Agency Agreement, shall maintain accounts and records evidencing each payment of principal and interest on the Bonds, which accounts and records shall constitute, in the absence of manifest error, prima facie evidence thereof.

24. The person or entity in whose name Bonds are recorded on the Book Entry Register shall be deemed to be the beneficial owner thereof for all purposes and payment of or on account of the principal and interest on such Bonds shall be made by the Registrar only to or upon the order in writing of such person or entity. Neither JHPC nor the Registrar shall be bound to inquire into the title of any such holder.

25. If any payment of principal or interest on the Bonds made by the Registrar to a Holder pursuant to this Bond certificate is returned to the Registrar for any reason, the Registrar shall deposit and hold such payment in a segregated, interest-bearing account established and maintained by the Registrar for the benefit of all of such Holders from time to time (the "Segregated Account"). Forthwith after return of such payment to the Registrar, it shall, in addition to any other actions agreed upon between the Registrar and JHPC, provide written notice of such return to the Holder at the address last shown for such Holder in the Book Entry Register by first-class prepaid mail, requesting particulars for a new bank account to which payments under the Bonds may be made and advising such Holder that the amounts so deposited will not accrue interest for the benefit of such Holder and that if such payment is not claimed by such Holder within six (6) years of the date of deposit of such payment by the Registrar into the Segregated Account, the Holder shall have no further right or claim thereto against the Registrar or JHPC and the amount of the payment, together with all interest accrued thereon, shall then be paid to JHPC. The Registrar shall forthwith make such payment to such Holder upon receipt of particulars for a new bank account to which payments under the Bonds may be made; provided that such Holder shall not be entitled to any interest with respect to such payment and all interest accrued thereon in the Segregated Account shall be for the account of, and paid to, JHPC. Upon deposit of such payment into the Segregated Account, the obligations of the Registrar to such Holder with respect to such payment shall be satisfied and discharged to the full extent of the amount deposited and thereafter, in the case of any payment of principal, the Bonds of such Holder shall be deemed to have been repaid by the amount of such payment and such Holder shall have no further right other than to receive out of the payment so deposited, the amount to which such Holder was entitled on the applicable Interest Payment Date, or Retirement Date, as the case may be.

26. Any amount deposited pursuant to Section 30 and not claimed by and paid to the applicable Holder as provided in Section 30 within six years after the date of such deposit shall be repaid to JHPC by the Registrar on demand, together with all interest accrued thereon, and thereupon the Registrar shall be released from all further liability to JHPC and the Holder with respect to such amount. Thereafter, the Holder in respect of which such amount was so repaid to JHPC shall have no rights in respect thereof and JHPC shall be discharged from its obligations in respect thereof.

27. Upon payment of principal and interest on the Bonds by JHPC to the Registrar in the manner aforesaid, the liability of JHPC for the principal or interest amount so paid shall be satisfied and discharged to the full extent of the sum paid. Upon payment of principal and interest on the Bonds by the Registrar to the Holders in the manner aforesaid, the liability of the Registrar to the Holders shall be satisfied and discharged to the full extent of the sum paid.

Not Bound by Trust

28. Neither JHPC nor the Registrar shall be bound to take notice of or see to the performance or observance of any duty owed to any third person or entity (whether under a trust, express, implied, resulting or constructive, in respect of any Bonds or otherwise) by any Holder of a Bond or any Indirect Holder of a Bond or any person or entity whom JHPC or the Registrar treat, as permitted or required by law, as the beneficial owner or the holder of such Bonds, and JHPC or the Registrar may transfer such Bonds on the direction of the person or entity so treated or registered as the holder thereof in the Legal Register, in the case of JHPC, or the Book Entry Register, in the case of the Registrar, whether named as trustee or otherwise, as though that person or entity was the beneficial owner of such Bonds. Payments to or to the order of the person or entity so treated or registered as the holder of such Bonds in the Legal Register shall discharge the liability of JHPC and payments to or to the order of the person or entity shown as the Holder in the Book Entry Register shall discharge the liability of the Registrar, in each case, to the full extent of the sum paid.

Purchases

29. JHPC may, at any time and from time to time, purchase all or any of the Bonds in the open market (which shall include purchase from or through an investment dealer or a firm holding membership on a recognized stock exchange) or by tender or by private contract, at any price.

TABLE 2-continued

30. If, upon an invitation for tenders, more Bonds are tendered at the same lowest price that JHPC is prepared to accept, the Bonds to be purchased by JHPC shall be selected by JHPC, in such manner (which may include selection by lot, selection on a prorata basis, random selection by computer or any other method) as JHPC considers appropriate, from the Bonds tendered by each tendering holder of Bonds that tendered at such lowest price. For this purpose JHPC may make, and from time to time amend, regulations with respect to the manner in which Bonds may be so selected, and regulations so made shall be valid and binding upon all holders of Bonds, notwithstanding the fact that, as a result thereof, one or more of such Bonds become subject to purchase in part only.
31. Bonds purchased in whole or in part by JHPC shall not be reissued or resold and the Registrar shall forthwith cancel such Bonds to the extent of such purchase on the Book Entry Register. The Registrar shall surrender the Single Bond in exchange for a replacement bond certificate in the aggregate principal amount of the Bonds then outstanding.
    Governing Law
32. The Bonds are governed by and shall be construed in accordance with the laws of Japan.
    Amendments
33. Except as otherwise provided in Section 39, from time to time, JHPC may, without the consent of the Registrar or any beneficial or registered holder of the Bonds, (including, without limitation, Holders and Indirect Holders of the Bonds) amend this Bond certificate (including, without limitation, these terms and conditions) for the following purposes:
    a. adding to the covenants of JHPC herein contained for the protection of the holders of Bonds;
    b. making such provisions not inconsistent with this Bond certificate (including, without limitation, these terms and conditions) as may be necessary or desirable with respect to matters or questions arising hereunder, including the making of any modifications in the form of the bond certificate that do not affect the substance thereof and that it may be expedient to make, provided that such provisions and modifications will not materially adversely affect the interests of the holders of Bonds;
    c. evidencing the succession, or successive successions, of successors to JHPC or the Registrar or Depository; and
    d. making any changes or corrections in or to this Bond certificate or any other certificate into which this Bond certificate may be exchanged or transferred (including, without limitation, these terms and conditions hereof) that are required for the purpose of curing or correcting any ambiguity or defective or inconsistent provision or clerical omission or mistake or manifest error contained herein, provided that the rights of the holders of Bonds are in no way materially adversely affected thereby.
34. No amendment to the rights, duties or obligations of the Registrar (including as a Depository) set out in this Bond certificate (including, without limitation, these terms and conditions) may be made by JHPC without the prior written consent of the Registrar.
    Dealing with Registrar
35. All of the terms and conditions of the Registrar and Paying Agency Agreement are incorporated by reference into these terms and conditions and form a part hereof as if they were set out in full herein. In the event of any conflict or inconsistency between any provision of the Registrar and Paying Agency Agreement and a provision of the Single Bond (including, without limitation, these terms and conditions), the provision of the Single Bond shall govern. A copy of the Registrar and Paying Agency Agreement may be obtained by written request from the Registrar at the address shown below.
36. Holders of Bonds may contact the Registrar at:
    3% Japanese Tomei Highway Construction & Operation Bonds
    c/o Sakura Bank, Tokyo
    Telephone: 81-3-3580-5931
    Fax: 81-3-3580-5400

One exception is the fixed rate financing instrument for the "JAPANESE HIGHWAY" project listed in FIG. 6 with a Securities Identification Number ID20020401. The "3% Japanese Tomei Highway Construction & Operation Bonds" (although named as bonds, it is a fixed rate financing instrument of the invention) has no redemption period but provides a dividend (which may be fixed or variable depending on the nature of the public works). Accordingly, the Bonds has a legal nature of equity. Its interest payment comes with a guarantee of 60% by the Japanese government, i.e., a nature of debt. The Bonds can be categorized as equity with a nature of debt. The Bonds bear a fixed interest rate at 3% per annum as set out on the face thereof until a Retirement Date of the Highway project. A 3% dividend to be paid before the accumulated dividend payments reach the principal has the nature of interest (debt), while a 3% dividend to be paid after the accumulated dividend payments reach the principal has the nature of dividend (equity). The dividend payments for the two different stages are generally referred as "Interest" in Table 2.

Rather paying back the principle on a redemption date, the Bonds pays a flat interest/dividend of 3% of the principle until the retirement date of the Highway, and 60% of interest/dividend payment is guaranteed by the United States government. Before the completion of the Tomei Highway, the proceeds from selling the 3% Japanese Tomei Highway Construction & Operation Bonds (Written Terms & conditions in FIG. 9) pay for the construction and the interests to its holders (via the facilitator, Sakura Bank, of the instruments). After the completion of the Tomei Highway, the revenues and profits generated by the tolls, etc. pay for the interest/dividend to the instrument holders. In Japan, interest rates are lower than 0.2% annually such that a flat 3% interest/dividend payment with 60% of the principle guaranteed are attractive for investors.

If the Japan Highway Public Corporation ("JHPC") defaults on interest/dividend payments, the grantor pays 60% of interest/dividend payments until the retirement of the Tomei Highway. The remaining 40% interest/dividend payments are not guaranteed by any other third parties, thus has to be paid by the JHPC out of revenues, assets, etc. based upon the negotiation between the creditors and the debtors or any applicable bankruptcy proceedings.

The fixed rate financing instruments of the invention are novel and nonobvious because they have nature both as debt and as equity. As discussed, even though Article 2 of the Japanese Law and the US Securities Exchange Act of 1934 widely defined securities, the fixed rate financing instruments of the invention correspond to none of the legally defined or commercially available securities. To raise fund from the public in Japan, the fixed rate financing instruments of the invention may be recognized under the Japanese Law as "security or instrument that may be prescribed by a Cabinet order" which is "deemed to require the assurance of the public interest or the protection of investors in the light of its liquidity and other circumstances <19>".

To offer newly-issued stocks, bonds, or the fixed-rate financing instrument of the invention to the public without mountains of red tape, expenses to the underwriters, the invention provide an electronic securities issuing method includes a step of (1) public-offering the fixed rate financing instrument on-line directly by the issuing legal entity; or (2) public-offering the fixed rate financing instrument through a direct purchase plan directly by the issuing legal entity. The method delivers to a potential purchaser a financial disclosure as required by law, requests the potential purchaser to acknowledge receipt and review of the financial disclosure, and confirms the acknowledgement of the financial disclosure by the potential purchaser. The method then requests the potential purchaser to specify a purchasing quantity of the fixed rate financing instrument, finalizes the purchasing quantity and time, and then informs the potential purchaser the finalized purchasing quantity and time.

The invention further provide a method for forming a new market comprising one of (1) preparing a fixed rate financing instrument based upon the above-mentioned method, and (2) public-offering the fixed rate financing instrument and delivering to a potential purchaser based upon the above-mentioned method.

These methods can be implemented by any computer software or hardware systems and networks, i.e., any systems, servers, methods, programs and computer-readable recording media, known to one skilled in the art.

On the other hand, the securities issuing institution can provide various services for each user institution depending on this mode of the embodiment. For example, it is possible to arrange a post-issue lump sum settling based on the securities issuing result information or provide discount service depending on the number of securities issued for each user institution. This makes it possible for the securities issuing institution to monopolize, practically speaking, each user institution's securities purchase needs.

Also, according to this embodiment, processes within the institution such as charging forward and its registration become unnecessary as the fee settling procedures are done for the user institutions.

To promote the transactions of bonds and the fixed rate financing instruments of the invention, a formal exchange for bonds or unique fixed rate financing instrument shall be establish at each major industrial country, such as US, Japan, etc. A bond exchange is an organization of which the members are bond brokers. A bond exchange provides facilities for the trading of bonds and other financial instruments. Such facilities are also provided for the issue and redemption of the bonds as well as other capital events including the payment of interests and dividends. An effective bond exchange becomes the most important component of a active bond market. Gradually, all bond exchanges will become part of the global securities market.

The current Cross-Matching Systems as categorized by the Bond Market Association brings both dealers and institutional investors together in electronic trading networks that provide real-time or periodic cross-matching sessions. Customers enter anonymous buy and sell orders with multiple counterparties that are automatically executed when contra side orders are entered at the same price or when the posted prices are "hit" or "lifted." Sometimes, customers initiate negotiation sessions to establish the terms of trades.

The invention improves the Cross-Matching Systems to provide a real-time double-auction system which allows not only dealers and institutional investors, but also individual investors of the general public to submit offers to buy or sell bonds and fixed rate financing instruments, and matches the offers in a real-time fashion so as to promote the efficiency of electronic trade execution and reduce transactional costs. The offers, orders and pricing data are transparent for all participants to access, and the participants receive instant trade confirmation.

As the "Terms" of a "fixed rate financing instrument" of the invention include a percentage of guarantee by third parties to the issuance, it allows the inventors to screen or search the "fixed rate financing instruments" by "percentage of guarantee by third parties to the issuance," which is not available in any existing screeners for stock, bond, or other securities.

According to the invention, a potential purchaser (an institutional investor or a member of the general public) can go directly a physical or online offering site of a private corporation to view prospectus and to offer to purchase and/or to directly purchase the newly-issued financing instruments from the private corporation. Alternatively, the user may offer to purchase or purchase the newly-issued financing instruments via a direct purchase plan offered by the private corporation. As such, the invention provides new market mechanisms which allow people to trade fixed rate financing instruments.

Investors can purchase the new financial products of the present invention that are neither stocks nor bonds, and seek profits in a new financial market that did not exist before, while business operators can obtain funds using these securities that are neither stocks nor bonds. The financial instruments according to the present invention will dig up latent private funds in private sectors to be invested into public works. Therefore, the present invention will help the national as well as local governments of various countries of the world to improve infrastructures such as roads and healthcare facilities even under a tight financial condition.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An operation financing system comprising:
   means for preparing a financing instrument specifying an operation to be financed, at least one issuing private legal entity which issues the financing instrument as evidence of debt to acquire funds to finance the operation, a face value to be paid to said issuing private legal entity in exchange for owning the financing instrument, and an interest rate defining periodical interest payments to an instrument holder as a percentage of the face value;
   means for sending an application for offering the financing instrument and financial disclosure regarding at least one operation financed through the financing instrument to a governing body that oversees exchange of financing instruments for review or registration as required by law;
   means for delivering to a potential purchaser said financial disclosure, requesting the potential purchaser to acknowledge receipt and review of said financial disclosure as required by law, after finalizing the registration, and confirming acknowledgement of said financial disclosure from the potential purchaser, and at least one of:
   (1) means for public-offering the financing instrument on-line directly by said issuing private legal entity, and
   (2) means for public-offering the fixed rate financing instrument on-line through a direct purchase plan by said issuing private legal entity;
   means for requesting the potential purchaser to specify a purchasing quantity of the financing instrument and an account for charging an amount equal to a price multiplying the purchasing quantity;
   means for verifying availability of the purchasing quantity in inventory and availability of the amount in the account;
   means for finalizing the purchasing quantity and a purchasing time by the issuing private legal entity for the potential purchaser, if the purchasing quantity is available in inventory and the amount is available in the account; and
   means for informing the potential purchaser the finalized purchasing quantity and time.

2. The operation financing system according to claim 1, further comprising means for requesting and verifying an identity and a chargeable account of the potential purchaser.

3. The operation financing system according to claim 1, further comprising means for listing the financing instrument with an instrument exchange; and transacting the financing instrument through the instrument exchange which matches and publishes transactions in a real-time manner.

4. The operation financing system according to claim 1, wherein the governing body is a public agency.

5. The operation financing system according to claim 1, further comprising means for encrypting and delivering an electronic file containing the financing instrument according to the finalized purchasing quantity to the potential purchaser thereby printing out a hardcopy of the financing instrument.

6. The operation financing system according to claim 1, further comprising means for encrypting and delivering an electronic file containing the financing instrument according to the finalized purchasing quantity and time to a depository as designated by the potential purchaser.

7. A method for financing an operation implemented on an appropriately programmed server on a network that is operatively connected to at least one appropriately programmed computer through which data may be inputted and outputted, comprising:
   preparing a financing instrument specifying an operation to be financed, at least one issuing private legal entity which issues the financing instrument as evidence of debt to acquire funds to finance the operation, a face value to be paid to said issuing private legal entity in exchange for owning the financing instrument, an interest rate defining periodical interest payments to an instrument holder as a percentage of the face value; and
   at least one of:
   (1) public-offering via the server the financing instrument on-line directly by said issuing private legal entity; and
   (2) public-offering via the server the financing instrument through a direct purchase plan by said issuing private legal entity;
   via the computer, delivering to a potential purchaser said financial disclosure as required by law, requesting the potential purchaser to acknowledge receipt and review of said financial disclosure as required by law, and confirming acknowledgement of said financial disclosure from the potential purchaser; and
   processing by the server a requested transaction by retrieving information via a network.

8. The method for financing an operation according to claim 7, further comprising:
   requesting by the computer the potential purchaser to specify a purchasing quantity of the financing instrument and an account for charging an amount equal to a price multiplying the purchasing quantity;
   verifying by the server availability of the purchasing quantity in inventory and availability of the amount in the account;
   finalizing by the server the purchasing quantity and a purchasing time by the issuing legal entity for the potential purchaser, if the purchasing quantity is available in inventory and the amount is available in the account; and
   informing the potential purchaser by the computer the finalized purchasing quantity and time.

9. The method for financing an operation according to claim 7, further comprising requesting and verifying by the computer an identity and a chargeable account of the potential purchaser.

10. The method for financing an operation according to claim 7, further comprising listing by the server the financing instrument with a fixed rate instrument exchange; and transacting the financing instrument through the instrument exchange which matches and publishes transactions in a real-time manner.

11. The method for financing an operation according to claim 7, wherein the governing body is a public agency.

12. The method for financing an operation according to claim 7, further comprising encrypting and delivering by the server an electronic file containing the financing instrument according to the finalized purchasing quantity to the potential purchaser through the computer thereby printing out a hardcopy of the financing instrument.

13. The method for financing an operation according to claim 7, further comprising encrypting and delivering by the server an electronic file containing the financing instrument according to the finalized purchasing quantity and time to a depository as designated by the potential purchaser.

14. The method for financing an operation according to claim 7, wherein the financing instrument further specifies a financing purpose which stipulates said operation to be executed with said funds.

15. The method for financing an operation according to claim 7, wherein said third party to issuance includes one of an international organization, a national or local government, a national or local government agency, a profit or non-profit entity, and a financial or non-financial entity.

16. The method for financing an operation according to claim 7, wherein said operation constitutes public works or services provided through public works.

17. The method for financing an operation according to claim 7, wherein the financing instrument further specifies a redemption date on or after which the instrument holder may redeem a full amount the face value by presenting the financing instrument to said issuing legal entity or representatives thereof.

18. The method for financing an operation according to claim 7, wherein the financing instrument further specifies an operation lifetime or a retirement date on or after which said operation will stop.

\* \* \* \* \*